US011726484B1

(12) United States Patent
Gerdes et al.

(10) Patent No.: US 11,726,484 B1
(45) Date of Patent: Aug. 15, 2023

(54) AIRPORT GROUND SUPPORT EQUIPMENT NAVIGATION SYSTEM

(71) Applicant: Delta Air Lines, Inc., Atlanta, GA (US)

(72) Inventors: Sterling Gerdes, Peachtree City, GA (US); William Seo, Atlanta, GA (US); Vandan Patel, Lilburn, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 35 days.

(21) Appl. No.: 17/337,119

(22) Filed: Jun. 2, 2021

Related U.S. Application Data

(60) Provisional application No. 63/033,955, filed on Jun. 3, 2020.

(51) Int. Cl.
*G05D 1/02* (2020.01)
*B64F 1/36* (2017.01)
(Continued)

(52) U.S. Cl.
CPC ............. *G05D 1/0214* (2013.01); *B64F 1/36* (2013.01); *G05D 1/0231* (2013.01); *G06V 20/58* (2022.01); *G08G 5/065* (2013.01); *G08G 7/00* (2013.01)

(58) Field of Classification Search
CPC ......... G05D 1/0022; G05D 2201/0213; G05D 1/0212; G05D 1/0214; G05D 1/024; G05D 1/0246; G05D 1/0248; G05D 1/027; G05D 1/0274; G05D 1/0278; G05D 1/106; G05D 1/0646; G05D 1/0083; G05D 1/0653; G05D 1/0027; G05D 1/0044; G05D 1/0061; G05D 1/0088; G05D 1/0291; G05D 1/0293; G05D 1/102; G05D 2201/0212; B64F 1/20; G08G 5/0026; G08G 5/0013; G08G 5/0043; G08G 5/0034; G08G 5/0039; G08G 5/0091; G08G 5/0082; G08G 5/006; G08G 5/0008;
(Continued)

(56) References Cited

U.S. PATENT DOCUMENTS

2019/0265714 A1* 8/2019 Ball .................. G05D 1/0221
2019/0316919 A1* 10/2019 Keshavamurthy ..................
G08G 1/096844

FOREIGN PATENT DOCUMENTS

| CN | 110503843 A | * 11/2019 | ........... G08G 1/0965 |
| CN | 110546958 A | * 12/2019 | ........ B60W 60/0011 |
| JP | 2019533609 A | * 11/2019 | |

* cited by examiner

*Primary Examiner* — Maceeh Anwari
*Assistant Examiner* — Aarron E Santos
(74) *Attorney, Agent, or Firm* — Hartman & Citrin LLC

(57) ABSTRACT

Concepts and technologies are disclosed herein for an airport ground support equipment navigation system. In one embodiment, a computer can be trained to recognize obstacles and navigate ground support equipment along an airport apron, to identify obstacles along a path or route, and to determine how to control the ground support equipment to safely navigate the obstacles to reach its intended target at a designated time. The computer also can provide a graphical user interface to a display. The graphical user interface can include visual indications providing information to a user about an obstacle along a route of the vehicle on the airport apron and how the vehicle may safely continue on along the route while avoiding the obstacle. In some implementations, the computer may autonomously control the vehicle and drivers may override the computer.

20 Claims, 21 Drawing Sheets

(51) Int. Cl.
*G08G 5/06* (2006.01)
*G08G 7/00* (2006.01)
*G06V 20/58* (2022.01)

(58) Field of Classification Search
CPC .. G08G 5/0069; G08G 5/0086; G08G 5/0056; G08G 5/0078; G08G 5/0052; G08G 5/025; G08G 5/045; G08G 1/16; G08G 5/0021; G08G 5/065; G08G 5/0065; G08G 5/003; G08G 5/0017; G08G 5/04; G08G 5/06; G08G 1/123; G08G 5/02
See application file for complete search history.

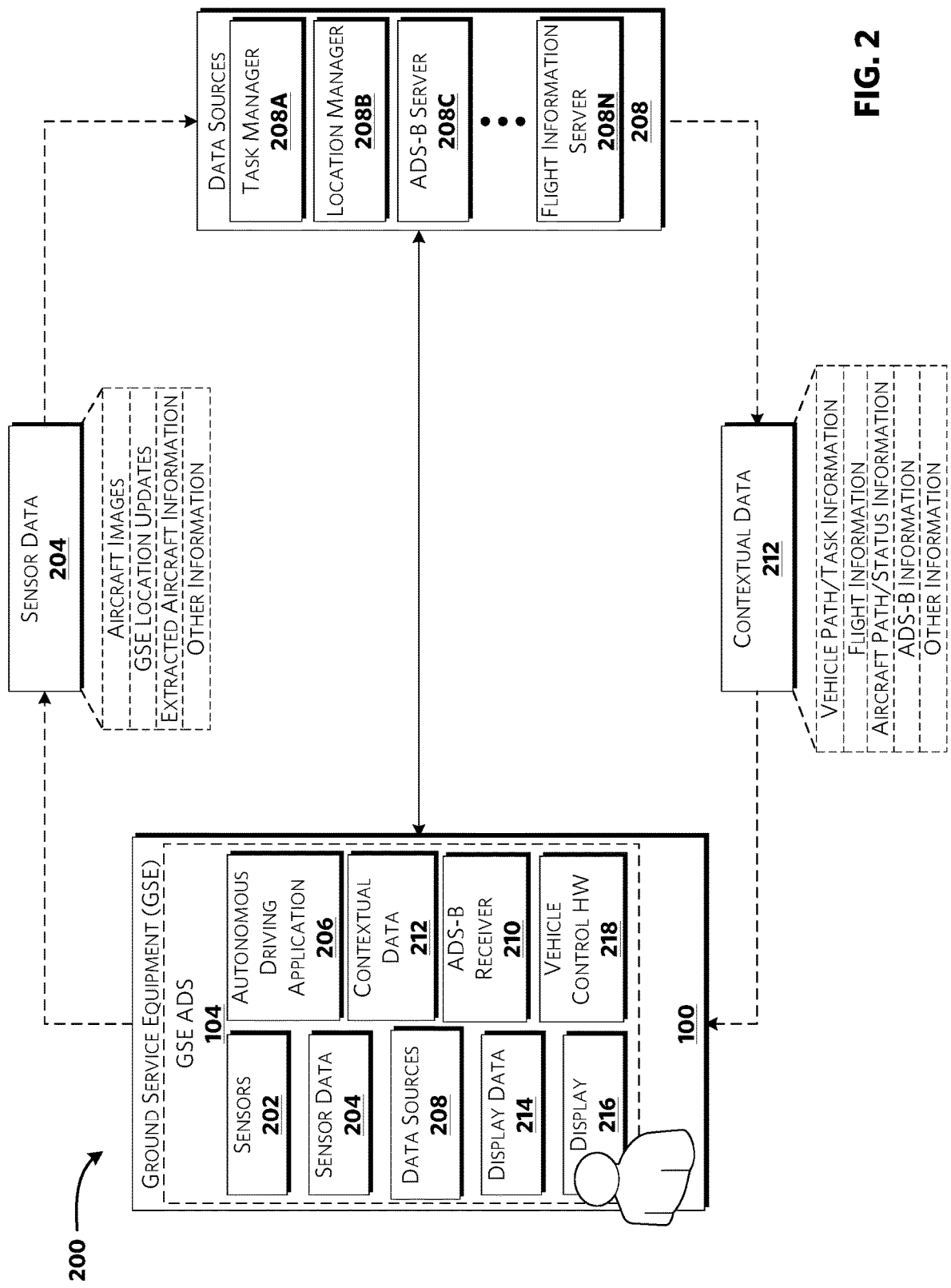

AIRPORT GROUND SUPPORT EQUIPMENT
NAVIGATION SYSTEM

CROSS-REFERENCE TO RELATED
APPLICATIONS

This application is a nonprovisional of and claims priority to U.S. Provisional Patent Application No. 63/033,955, entitled "Airport Apron Navigation System," filed Jun. 3, 2020, which is incorporated herein by reference in its entirety.

TECHNICAL FIELD

The present disclosure relates generally to airport operations. More particularly, the present disclosure relates to an airport ground support equipment navigation system.

BACKGROUND

Unless otherwise indicated herein, all disclosures in the background are not prior art to the claims in this application and are not admitted to be prior art by inclusion in this section.

Airplanes and/or ground support equipment (also referred to herein as ground support equipment vehicles, vehicles, airport ground support equipment, and/or by the acronym "GSE") such as, for example, vehicles such as tugs, dollies, luggage carts, fuel trucks, catering trucks, or the like; may travel on designated paths on an aircraft apron (also referred to as a "tarmac") to provide support services for aircraft and/or other airport operations. While travelling along the airport apron, ground support equipment may encounter obstacles such as, for example, other ground support equipment, ground crew, aircraft, jet blast from aircraft engines, combinations thereof, or the like.

BRIEF DESCRIPTION OF THE DRAWINGS

FIG. 2 is a system diagram illustrating a ground support equipment navigation system, according to an example embodiment of the concepts and technologies disclosed herein.

DETAILED DESCRIPTION

Figure 1:
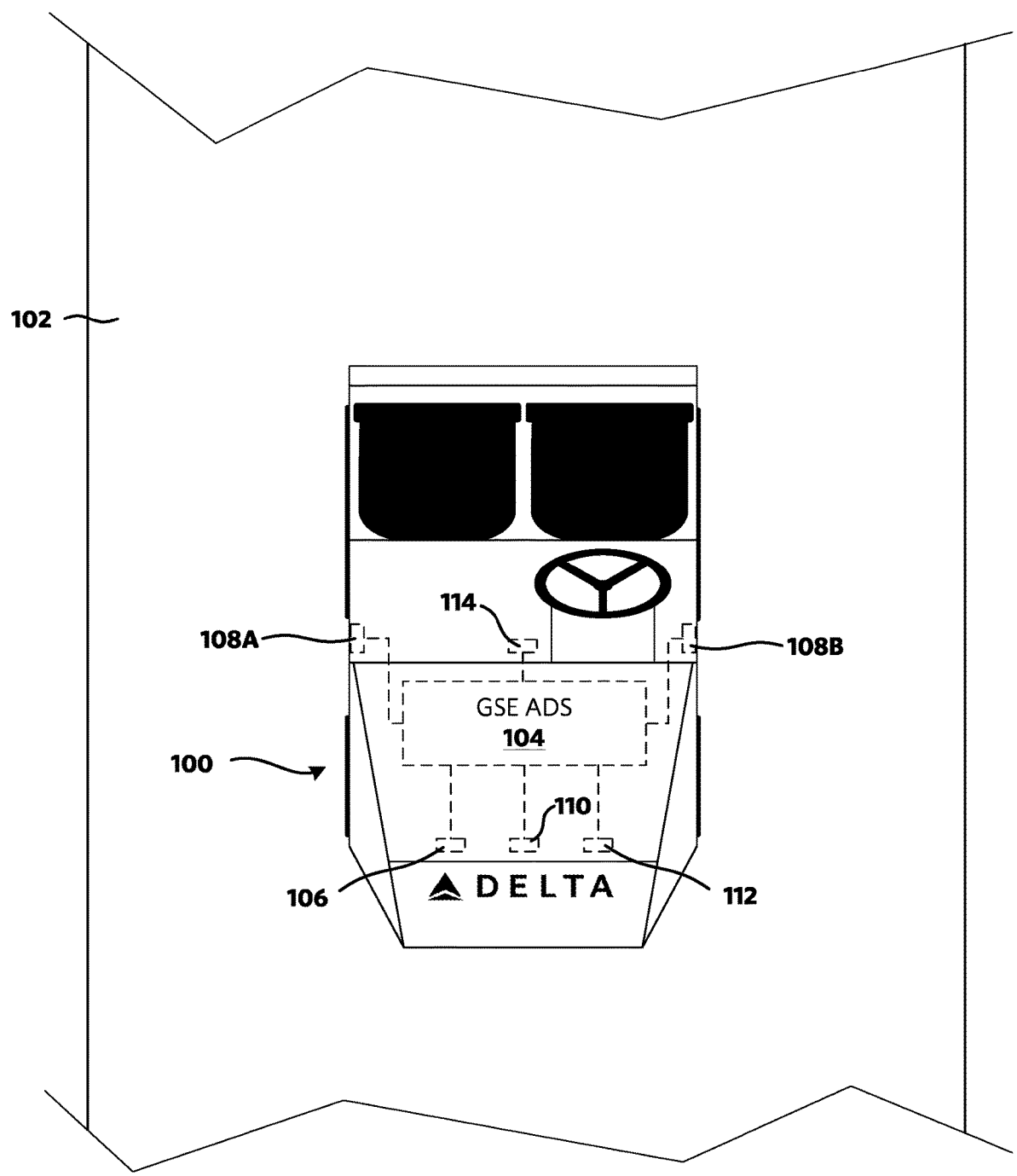
FIG. 1 is a line drawing illustrating ground support equipment, according to an example embodiment of the concepts and technologies described herein.

In the following detailed description, references are made to the accompanying drawings that form a part hereof and that show, by way of illustration, specific embodiments or examples. It must be understood that the disclosed embodiments are merely illustrative of the concepts and technologies disclosed herein. The concepts and technologies disclosed herein may be embodied in various and alternative forms, and/or in various combinations of the embodiments disclosed herein. The word "illustrative," as used in the specification, is used expansively to refer to embodiments that serve as an illustration, specimen, model, sample, or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of airport ground support equipment navigation system will be described.

The present disclosure is directed to an airport ground support equipment navigation system. The system can include an application (e.g., an application program, a service, a neural network or other artificial intelligence, combinations thereof, or the like) that can be executed by a computer located on a vehicle such as ground support equipment, or elsewhere (e.g., on a server, remote computer, or the like). The application can be trained to determine a location, task, and/or path of the ground support equipment; to recognize in photographs or videos, aircraft, ground crew, buildings, other ground support equipment, and/or other moveable and/or non-moveable obstacles at an airport or other facility or other environment of the ground support equipment; to determine paths and/or movements of the ground support equipment and the various obstacles identified; and to navigate the ground support equipment through or along the airport apron while avoiding the detected obstacles and/or delays that may result from the obstacles. The application also can be configured to control the ground support equipment autonomously, or to assist a driver or other user to control the ground support equipment via a graphical user interface or other display (e.g., by outputting instructions and/or information relating to the obstacles and/or routing to avoid the obstacles).

When a vehicle such as a ground support equipment vehicle encounters or approaches an obstacle on its intended path along an airport apron, a driver of the ground support equipment may be unsure whether to wait for the obstacle to pass, to proceed along the intended path, or to change an intended path. In particular, the inexperienced driver may not know when or if the obstacle will cross the intended path of the ground support equipment. For example, a driver encountering an aircraft at a gate or elsewhere may be unaware or unsure whether the aircraft is arriving at the gate, parked at the gate, or disembarking from the gate. Still further, an aircraft that appears to be potentially approaching or crossing an intended path of the ground support equipment may or may not actually be an obstacle for the ground support equipment (e.g., the path of the aircraft may not cross the intended path of the ground support equipment, the aircraft may not be moving from its current location, etc.).

As such, a driver of the ground support equipment may not know when he or she may continue to navigate the ground support equipment along the intended path without being impacted by the obstacle such as an aircraft, other ground support equipment, jet blast from an aircraft, or other entities, for example. Some drivers may be overly cautious when approaching or reaching an obstacle (or apparent obstacle) by stopping and waiting for the obstacle to pass. Such an approach may potentially impact customer commitments and/or schedules unnecessarily, for example, where the object thought to be an obstacle actually is not an obstacle to the continued movement of the ground support equipment. Alternatively, the obstacle may not pass a particular location or path for a prolonged period, thereby resulting in a delay of the ground support equipment if the ground support equipment had stopped to allow the obstacle to pass. The ground support equipment therefore may not reach a task or target location on schedule, thus potentially delaying another support service event or task (e.g., loading/unloading of baggage, fueling of an aircraft, departure of an aircraft, etc.) at the airport.

Some drivers of ground support equipment can quickly recognize and overcome obstacles along an airport apron and reach a target location within a predetermined timeline. Experienced drivers may quickly recognize a path of a vehicle or an aircraft. For example, experienced drivers may quickly determine if an aircraft is about to leave a gate for a runway based on past experiences and knowledge. Thus, experienced drivers may know when ground support equipment has time to cross the path of the airplane or other vehicle without losing cargo, without being caught in a jet blast associated with the aircraft, without causing a collision, without holding up other traffic, or otherwise impacting other equipment and/or vehicles. Further, the experienced driver may know when there is insufficient time to cross a path of an airplane or ground support equipment, and therefore knows when to wait. Such drivers may have years of experience learning how to balance efficient navigation of the airport apron and obstacles to safely meet desired a timeline.

A system and method for navigating an airport apron as presented herein can include an application that can be trained to identify obstacles, e.g., airplanes, buildings, ground crews, ground support equipment, etc., along a route of one or more vehicles, e.g., a ground support equipment, and determine how to navigate the obstacles to reach an intended target at a designated time. In some embodiments of the concepts and technologies disclosed herein, a jet blast can also be determined to be an obstacle. In particular, a safe range of a jet engine can be known and/or determined for a particular aircraft (e.g., knowledge of the aircraft manufacturer can include knowledge of a location of the aircraft engine on the aircraft, a manufacturer of the aircraft engine, and various performance characteristics associated with the aircraft engine). Based on these and/or other types of information, a range for which the jet blast from the engine poses a threat to vehicles, personnel, and/or other entities can be determined. Thus, the location of the aircraft can be used to determine if the jet blast poses a threat, obstacle, and/or likely delay for the ground support equipment. The trained application may detect these and/or other types of obstacles, and further may provide a graphical user interface to a display at the computer or elsewhere. The graphical user interface may include visual indications providing information about an obstacle along a route of a vehicle (e.g., ground support equipment) on the airport apron and how the ground support equipment or other vehicle may safely continue along the route while avoiding the obstacle. In some implementations, the trained computer may autonomously control the ground support equipment and/or other vehicles.

Referring first to FIG. 1, an example embodiment of ground support equipment 100 is shown operating on an airport apron or tarmac (hereinafter "airport apron") 102. The airport apron 102 can include an area of an airport or other facility where aircraft are parked, maintained, loaded, fueled, charged, supplied, serviced, stored, boarded, taxied, and/or unloaded. In some instances, the airport apron 102 may be referred to by other names such as an "apron," a "tarmac," a "flight line," a "ramp," or the like. Although airport aprons such as the airport apron 102 illustrated and described herein generally are understood as excluding a runway, taxiway, service roads, and/or hangars of the airport, it should be understood that the concepts and technologies illustrated and described herein for a ground support equipment navigation system can be used on these and/or other portions of the airport or other facility. As such, the features of the concepts and technologies disclosed herein are not necessarily limited to use on an airport apron 102.

As is generally understood, the airport apron 102 may be limited access and use of the airport apron 102 may generally be controlled by an apron management service and/or other entity that can allocate portions of the airport apron 102 for movements, parking, taxiing, and the like. In some embodiments, movements of various types of equipment (e.g., ground support equipment such as the ground support equipment 100) may be controlled and/or managed by the apron management service and/or other entities, as well as being subject to various rules and/or conventions. The apron management service can, in some embodiments, relay, e.g., to the ground support equipment such as the ground support equipment 100, information regarding hazards on the airport apron 102, air traffic control ("ATC") information, weather conditions, movements of other equipment and/or aircraft, and/or other information. It can be appreciated that the airport apron 102 can cover large contiguous and/or non-contiguous paved and/or unpaved areas over the ground, underground, across multiple facilities, and/or the like. As such, it should be understood that the airport apron 102 illustrated and described herein is illustrative and should not be construed as being limiting in any way.

In FIG. 1, the ground support equipment 100 is illustrated as a "tug." Because other types of ground support equipment 100 are possible and are contemplated, it should be understood that this example is illustrative, and therefore should not be construed as being limiting in any way. In particular, according to various contemplated implementations of the concepts and technologies disclosed herein, the ground support equipment 100 can include other self-propelled and/or powered embodiments of ground support equipment such as, for example, refueling vehicles, tugs, tractors, firefighting equipment, deicing equipment, ground power units, buses, container loaders, container transporters, transporters, water trucks, sewage management vehicles, catering vehicles, belt loaders, pushback vehicles, air start units, and/or other self-propelled and/or powered vehicles and/or devices. Because the concepts and technologies disclosed herein can be used in additional and/or alternative types of ground support equipment, it should be understood that these examples are illustrative, and therefore should not be construed as being limiting in any way.

According to various embodiments of the concepts and technologies disclosed herein, the ground support equipment 100 can include a ground support equipment autonomous driving system 104 (labeled "GSE ADS 104" in FIG. 1). The ground support equipment autonomous driving system 104 can be configured to collect information using one or more on-board sensors (e.g., wide angle cameras, cameras, radar and/or light detection and ranging ("LIDAR") devices, proximity sensors, combinations thereof, or the like), which can be connected to and/or part of the ground support equipment autonomous driving system 104, as schematically illustrated in FIG. 1. The ground support equipment autonomous driving system 104 also can be configured to collect contextual data from one or more data sources (not shown in FIG. 1). The one or more data sources can be located onboard the ground support equipment 100 and/or remote from the ground support equipment 100. The ground support equipment autonomous driving system 104 can be configured to analyze the data collected with the sensors and the contextual data to determine an ideal travel path for the ground support equipment 100, in some embodiments.

According to various embodiments of the concepts and technologies disclosed herein, the ground support equipment autonomous driving system 104 can also be configured to autonomously control movements of the ground support equipment 100 along the airport apron 102 and/or elsewhere as illustrated and described herein. In some embodiments of the concepts and technologies disclosed herein, the ground support equipment autonomous driving system 104 can be configured to navigate the ground support equipment 100 along the airport apron 102 with and/or without the use of external data as will be illustrated and described herein. Additional details of the ground support equipment autonomous driving system 104 will be illustrated and described in additional detail below.

In the illustrated embodiment of the ground support equipment 100, the ground support equipment autonomous driving system 104 is illustrated as including and/or communicating with a front far camera 106, two side wide-angle cameras (108A, 108B), a radar and/or ultrasonic sensor 110, and a thermal imaging and/or stereo camera 112. These and/or other cameras will be illustrated and described in more detail below with reference to the sensors in FIG. 2. According to various embodiments of the concepts and technologies disclosed herein, the ground support equipment autonomous driving system 104 also can include and/or can communicate with a driver aid monitor 114, which can include a computing device, a display, and/or other hardware (e.g., a heads up display or link to other types of display equipment). The driver aid monitor can include, for example, a processor, a graphics processing unit, a memory, a display, an input device, combinations thereof, or the like. Because the various elements of the ground support equipment autonomous driving system 104 can be located at additional and/or alternative locations on the ground support equipment 100, it should be understood that the illustrated locations are illustrative of one contemplated embodiment and should not be construed as being limiting in any way.

Although not shown separately in FIG. 1, it should be understood that the ground support equipment autonomous driving system 104 can include hardware for controlling functions of the ground support equipment such as a throttle control, a steering control, a brake control, combinations thereof, or the like. The above-noted and additional components of the ground support equipment autonomous driving system 104 are illustrated and described in more detail below with reference to FIGS. 2-8. As will be explained in more detail herein, data and/or signals from the sensors may be provided, by the ground support equipment autonomous driving system 104, to one or more data sources and/or applications to provide the functionality illustrated and described herein for autonomously controlling the ground support equipment 100. It should be understood that this example is illustrative, and therefore should not be construed as being limiting in any way.

Turning now to FIG. 2, a system diagram illustrating a ground support equipment navigation system 200 will be described, according to one example embodiment of the concepts and technologies disclosed herein. As shown in FIG. 2, the ground support equipment navigation system 200 can include the ground support equipment 100 (e.g., the ground support equipment 100 shown in FIG. 1), and the ground support equipment 100 can include the ground support equipment autonomous driving system 104. It should be understood that this example is illustrative, and therefore should not be construed as being limiting in any way.

According to various embodiments of the concepts and technologies disclosed herein, the functionality of the ground support equipment autonomous driving system 104 can be provided, at least in part, by one or more computing devices, each of which can include one or more processors and one or more memory devices. In some embodiments, the computing device can further include networking hardware, input/output devices, and/or other components as will be illustrated and described herein with reference to FIG. 8. The ground support equipment autonomous driving system 104 can be attached to, installed at, and/or otherwise located at or in proximity to the ground support equipment 100, in some embodiments. It should be understood that this example is illustrative, and therefore should not be construed as being limiting in any way.

According to various embodiments of the concepts and technologies disclosed herein, the ground support equipment autonomous driving system 104 can include additional hardware (in addition to the computing device functionality as noted above) as will be described below. In the illustrated embodiment, the ground support equipment autonomous driving system 104 includes one or more sensors 202, as noted above with reference to FIG. 1. The word "sensors" is used expansively herein to include various types of devices that collect or generate information or signals, as will be explained in more detail below. The sensors 202 can include, for example, one or more optical sensors, one or more location devices, one or more speed sensors, one or more trajectory sensors, one or more signal detection devices or receivers, and/or one or more other sensors. Because additional and/or alternative sensors can be included in the ground support equipment autonomous driving system 104, it should be understood that the examples of sensors 202 provided herein are illustrative, and therefore should not be construed as being limiting in any way.

According to various embodiments of the concepts and technologies disclosed herein, the optical sensors can include, but are not limited to, one or more imaging devices that may or may not use actual sensors (e.g., charge-coupled devices ("CCD"), etc.) to capture imagery. Thus, the sensors 202 can include one or more cameras, one or more imaging devices or component, one or more thermal imaging sensors, one or more optical proximity sensors, one or more radar devices, one or more LIDAR devices, one or more infrared cameras or detectors, one or more stereo cameras, combinations thereof, or the like. It can be appreciated that images captured by the optical sensors can include still images (e.g., photographs, infrared images, etc.) or video images. Because these embodiments of optical sensors are illustrative, it should be understood that these examples are illustrative, and therefore should not be construed as being limiting in any way.

According to various embodiments of the concepts and technologies disclosed herein, the sensors 202 can include one or more location devices, which can include, but are not limited to, various location and/or proximity determination devices such as, for example, one or more global positioning system ("GPS") devices or sensors, one or more sonar devices, one or more LIDAR devices, one or more ultrasonic sensors, one or more wireless signal receivers and/or transceivers (e.g., a BLUETOOTH or WIFI device), other location devices, or the like. The sensors 202 also can include speed sensors such as, for example, one or more speedometers and/or other speed determination devices. The sensors 202 also can include trajectory sensors such as, for example, one or more compasses, one or more magnetometers, one or more gyroscopes, one or more motion processors, and/or other trajectory and/or movement sensors. The sensors 202 also can include other sensors such as, for example, light sensors (e.g., photocells), microphones and/or other sound sensors, combinations thereof, or the like. Because these sensors 202 are example embodiments, it should be understood that these examples are illustrative, and therefore should not be construed as being limiting in any way.

The sensors 202 can output and/or capture signals, data, or other information (e.g., imagery, sound, state, measurements, or the like) as sensor data 204. From the above description of the sensors 202, it can be appreciated that the sensor data 204 therefore can include, but is not limited to, one or more photographs or videos, one or more thermal images, one or more light images, one or more proximity determinations, one or more distances, one or more stereo images or videos, one or more sets of GPS coordinates or other location data, one or more ultrasonic sensor readings, one or more determined locations, one or more speeds, one or more headings, one or more detected movements or movement changes, one or more orientation indicators (e.g., pitch, yaw, tilt, etc.), one or more light measurements, one or more measured sounds and/or sound levels, combinations thereof, or the like. According to various embodiments of the concepts and technologies disclosed herein, the sensor data 204 can include one or more aircraft images, one or more ground support equipment location updates, extracted aircraft information (e.g., information extracted from images of aircraft), and/or other information, as will be explained in more detail hereinbelow. It should be understood that this example is illustrative, and therefore should not be construed as being limiting in any way.

According to various embodiments of the concepts and technologies disclosed herein, the ground support equipment autonomous driving system 104 can be configured to store and/or execute (e.g., using a memory and processor, respectively, of the ground support equipment autonomous driving system 104) an operating system (not illustrated in FIG. 2) and one or more application programs such as, for example, an autonomous driving application 206. The operating system can include a computer program that can control the operation of the ground support equipment autonomous driving system 104. The autonomous driving application 206 can include an executable program that can be configured to execute on top of the operating system to provide various functions as illustrated and described herein for providing an airport ground support equipment navigation system.

The autonomous driving application 206 can be configured to determine a path/route and/or a task associated with the ground support equipment 100, to detect one or more obstacles along the path or route of the ground support equipment 100, to determine how to respond to detected obstacles along the route or path, to generate and/or provide user interfaces as illustrated and described herein, to generate sensor data 204 to one or more other devices as explained below, to disambiguate and/or to obtain or provide context for collected information (e.g., the sensor data 204), and/or to provide autonomous driving operations and/or control as illustrated and described herein. In particular, the autonomous driving application 206 can be configured to obtain, from the sensors 202, sensor readings and/or data or signal outputs and to generate, based on the sensor output, the sensor data 204 illustrated and described herein. The autonomous driving application 206 also can be configured to pass, to one or more data sources 208, the sensor data 204. In some embodiments of the concepts and technologies disclosed herein, the sensor data 204 can be provided to the data sources 208 to provide updates to the data sources 208. In some other embodiments, the sensor data 204 can be used as a filter to query one or more of the data sources 208 for relevant contextual information, as will be explained in more detail below.

According to various embodiments of the concepts and technologies disclosed herein, the data sources 208 can include various sources or applications for obtaining data or other information that can be used by the autonomous driving application 206 to make navigation decisions for the ground support equipment 100. In particular, in various embodiments of the concepts and technologies disclosed herein, the data sources 208 can include a task manager 208A, a location manager 208B, an automatic dependent surveillance-broadcast ("ADS-B") server 208C, a flight information server 208N, and/or other data sources 208. The functionality associated with each of these data sources 208 will be explained in more detail below.

The task manager 208A can be configured to track one or more tasks to be performed by one or more ground support equipment (e.g., the ground support equipment 100) and/or to provide the determined or tracked tasks to the ground support equipment 100. As such, the task manager 208A can be a source of information relating to what tasks ground support equipment, including the ground support equipment 100, is involved with at any particular time. Based on information such as, for example, knowledge of a current location of the ground support equipment 100 and a task assigned to the ground support equipment 100, the route associated with the ground support equipment 100 can be determined. Based on a speed, location, and trajectory location, current and/or future locations of the ground support equipment 100 can be determined and/or extrapolated. It should be understood that this example is illustrative, and therefore should not be construed as being limiting in any way.

For example, the task manager 208A may be configured to provide, to a specific luggage tug (or other ground support equipment 100), a set of instructions to be performed by the luggage tug to move luggage through an airport facility. This set of instructions could include, for example, a first instruction for the luggage tug to pick up luggage at a conveyor belt at a particular location, a second instruction for the luggage tug to drive to a specific gate, a third instruction for the luggage tug to deliver the luggage to a specific airplane at the specific gate, a fourth instruction for the luggage tug to proceed from the specific gate to a next location to pick up specific cargo, and a fifth instruction for the luggage tug to transport the cargo to a specific destination. It should be understood that this example is illustrative, and therefore should not be construed as being limiting in any way. Also, it should be understood that the task manager 208A can provide such instructions to many types of ground support equipment, and therefore the above example is merely illustrative and should not be construed as being limiting in any way.

Because the task manager 208A can be responsible for generating and/or providing such instructions to ground support equipment including the ground support equipment 100, the task manager 208A can also be configured to store, e.g., in a data storage device such as a memory or database, multiple or even all tasks to be performed by multiple or even all ground support equipment. The task manager 208A illustrated and described herein can be configured to provide, e.g., to the ground support equipment autonomous driving system 104, location and route information for ground support equipment. The ground support equipment autonomous driving system 104 can be configured (e.g., via execution of the autonomous driving application 206) to determine current and/or future traffic conditions based on the route information for ground support equipment.

The route information for ground support equipment also can include, for each ground support equipment, identifying and/or other information such as, for example, a vehicle type associated with the ground support equipment 100 (e.g., a tug, a truck, a dolly, a cart, etc.); dimensions of the ground support equipment 100; capabilities of the ground support equipment 100 (e.g., top speed, operating time limits, braking distance, etc.); and/or cargo or other capacity of the ground support equipment 100 (e.g., luggage capacity or load, fuel capacity or load, water capacity or load, food capacity or load, lavatory waste capacity or load, etc.). It should be understood that this example is illustrative, and therefore should not be construed as being limiting in any way.

The location manager 208B can be configured to monitor locations, headings, trajectories, and/or speeds of one or more ground support equipment vehicles such as the ground support equipment 100 along the airport apron 102 and/or elsewhere. The location manager 208B can include a storage device (e.g., a memory, a database, or the like) for storing past and current geographic locations of each ground support equipment (e.g., the ground support equipment 100) that is being monitored by the location manager 208B. The location manager 208B also can store identifying and/or other information about each ground support equipment vehicle or device (e.g., the ground support equipment 100) being monitored by the location manager 208B (e.g., all ground support equipment currently in use and/or otherwise located at the airport apron 102 or other area). This information can include, but is not limited to, a vehicle type associated with the ground support equipment 100 (e.g., a tug, a truck, a dolly, a cart, etc.); dimensions of the ground support equipment 100; capabilities of the ground support equipment 100 (e.g., top speed, operating time limits, braking distance, etc.); and/or cargo or other capacity of the ground support equipment 100 (e.g., luggage capacity or load, fuel capacity or load, water capacity or load, food capacity or load, lavatory waste capacity or load, etc.). The location manager 208B also can be configured to track and/or provide real-time location, direction of travel, and speed of one or more ground support equipment such as the ground support equipment 100. This information can be used, in some embodiments, to determine a path of the ground support equipment 100. It should be understood that this example is illustrative, and therefore should not be construed as being limiting in any way.

The location manager 208B illustrated and described herein can be configured to provide, e.g., to the ground support equipment autonomous driving system 104, current location and/or path information for one or more ground support equipment. The ground support equipment autonomous driving system 104 can be configured (e.g., via execution of the autonomous driving application 206) to determine current and/or future traffic conditions based on this and/or other information, in some embodiments. It should be understood that this example is illustrative, and therefore should not be construed as being limiting in any way.

The automatic dependent surveillance-broadcast server 208C (labeled "ADS-B Server 208C" in FIG. 2) can be configured to monitor the locations of aircraft along the airport apron 102, runway, taxiway, hangars, and/or gates of an airport or other facility. The automatic dependent surveillance-broadcast server 208C can be configured to store, in a memory, database, or other data storage device, information about each aircraft at the airport or other facility. This information can include, but is not limited to, an aircraft type, an aircraft position, an aircraft speed, and an aircraft destination. The automatic dependent surveillance-broadcast server 208C can be configured to broadcast these and/or other types of information, and the ground support equipment autonomous driving system 104 can include an automatic dependent surveillance-broadcast receiver 210 (labeled "ADS-B Receiver 210" in FIG. 2) that can be configured to receive this information for use as illustrated and described herein. It should be understood that this example is illustrative, and therefore should not be construed as being limiting in any way.

The flight information server 208N can be configured to determine, based on an image of an aircraft (e.g., an aircraft image) and/or extracted aircraft information from the image of aircraft, various types of information regarding the aircraft. According to various embodiments of the concepts and technologies disclosed herein, the flight information server 208N can include an application or service that can be trained to recognize an aircraft from an image. According to various embodiments of the concepts and technologies disclosed herein, a training module can be used to train the flight information server 208N by developing heuristics based on data gathered from provided images of known aircraft. For example, the training module may train a decision making module, a neural network, an artificial intelligence model, a machine learning model, a path planner model, a navigation model, and/or a reinforcement model, which can be executed by a processor of the flight information server 208N. Thus, machine learning techniques can be used to train the flight information server 208N to recognize an aircraft based on data from an image.

The flight information server 208N can include a memory, database, or other data storage device that can store the heuristics such as historical data (e.g., provided images and corresponding aircraft information). Once trained, the flight information server 208N may be configured to determine, based on one or more images that include an aircraft, a type of aircraft (e.g., a manufacturer and/or model of the aircraft), a carrier operating the aircraft (e.g., Delta Air Lines), a tail number of the aircraft, and/or other information associated with the aircraft.

For example, the flight information server 208N can be configured to receive an image of an aircraft from the ground support equipment autonomous driving system 104 (e.g., as an aircraft image that can be a part of the sensor data 204). The flight information server 208N can be configured to determine, based on the image, a carrier that operates the aircraft (e.g., from the insignia, livery, text, or other markings on the tail, side, or elsewhere on the aircraft), the type of aircraft (e.g., based on the shape of and/or markings on the aircraft), and the tail number of the aircraft (e.g., from optical character recognition techniques and/or other text extraction technologies). Once the flight information server 208N determines the carrier, aircraft, and/or tail number, the flight information server 208N can be configured to retrieve (from various sources) flight information such as a destination of the aircraft, a departure time, an arrival time, a current location of the aircraft, designated gates, current flight status, and the like. It can be appreciated that the flight information server 208N can retrieve these and/or other information from one or more databases such as, for example, an airport database or service, a flight tracking database or service, combinations thereof, or the like.

The flight information server 208N illustrated and described herein can be configured to provide, e.g., to the ground support equipment autonomous driving system 104, the flight information for one or more aircraft. The ground support equipment autonomous driving system 104 can be configured (e.g., via execution of the autonomous driving application 206) to determine an expected path of the one or more aircraft based on this and/or other information, and thereby can determine if a detected aircraft is and/or will be an obstruction at some current time or in the future. It should be understood that this example is illustrative, and therefore should not be construed as being limiting in any way.

In some embodiments of the concepts and technologies disclosed herein, the data sources 208 can include an application or service that can provide the functionality of the autonomous driving application 206 as illustrated and described herein. As such, the data sources 208 can also be configured to determine paths or routes of various vehicles, to detect obstacles and/or delays along a path or route, and/or to issue route, path, and/or task changes to avoid obstacles and/or delays as illustrated and described herein. This information can be sent to the ground support equipment autonomous driving system 104 for implementation at the ground support equipment 100, in some embodiments.

The data sources 208 also can include an air traffic control publication medium such as a radio broadcast or other medium for providing air traffic control information to the ground support equipment autonomous driving system 104. This information may be used as part of contextual data 212 as well, as will be explained in more detail hereinbelow. It should be understood that this example is illustrative, and therefore should not be construed as being limiting in any way.

As shown in FIG. 2, some or all of the data sources 208 can be located on the ground support equipment 100, in some embodiments. In some such example embodiments, the data sources 208 can include one or more data structures or databases that can be periodically updated by the autonomous driving application 206 by receiving or implementing updates that can be sent to, received by, and/or otherwise obtained by the ground support equipment 100 (and/or the ground support equipment autonomous driving system 104 thereof). Thus, it can be appreciated that one or more devices may collect updates from the data sources 208 and provide those updates to the ground support equipment 100 (and/or the ground support equipment autonomous driving system 104 thereof), in some embodiments. In yet another embodiment of the concepts and technologies disclosed herein, the various data sources 208 can provide their data to the flight information server 208N, and the flight information server 208N can provide the contextual data 212 to the ground support equipment autonomous driving system 104. It should be understood that this example is illustrative, and therefore should not be construed as being limiting in any way.

In some other embodiments, as also illustrated in FIG. 2, the data sources 208 can be remote from the ground support equipment 100 and can be accessed by the ground support equipment 100 and/or the ground support equipment autonomous driving system 104 via one or more networks, data connections, or the like. Thus, it can be appreciated that the data sources 208 shown in FIG. 2 can correspond to data repositories, databases, data servers, application servers (e.g., servers that store data and/or that respond to requests for data by providing the requested data and/or context), combinations thereof, or the like. Thus, while the illustrated embodiment in FIG. 2 does not show any communication channels between the data sources 208 and the ground support equipment autonomous driving system 104, it should be understood that one or more connections between the ground support equipment 100 and the data sources 208 can exist in various embodiments. Thus, the illustrated embodiment is illustrative and should not be construed as being limiting in any way.

According to various embodiments of the concepts and technologies disclosed herein, the sensor data 204 can be provided to the data sources 208 (either locally and/or via communication channels), and the data sources 208 can provide, based on the sensor data 204, contextual data 212 that is relevant to and/or relates to the sensor data 204 and/or the ground support equipment 100. As shown in FIG. 2, the contextual data 212 can be provided to give context and/or to disambiguate the sensor data 204, to provide locations of potential obstacles along a path of the ground support equipment 100, and/or for other purposes, as will be described in additional detail hereinbelow.

According to various embodiments of the concepts and technologies disclosed herein, the contextual data 212 can include vehicle path/task information, flight information, aircraft path/status information, automatic dependent surveillance-broadcast information (labeled "ADS-B information" in FIG. 2), other information (e.g., location information, air traffic control information, etc.), combinations thereof, or the like. Because other information can be included in these and/or other types of contextual data 212, it should be understood that the illustrated embodiment is illustrative and should not be construed as being limiting in any way.

The vehicle path/task information can include location updates for vehicles (e.g., ground support equipment, aircraft, or other vehicles). The vehicle path/task information also, or alternatively, can indicate a task being undertaken by a particular vehicle. Thus, the task of the vehicle can be communicated as part of the contextual data 212, and the autonomous driving application 206 can use that task information, in some embodiments, to determine if a vehicle is and/or will remain an obstacle. It should be understood that this example is illustrative, and therefore should not be construed as being limiting in any way. The vehicle path/ task information can include location updates of the vehicle associated with the vehicle path/task information. These location updates can include coordinates (e.g., absolute location information) and/or relative location information (e.g., defining the position of a vehicle relative to another entity such as another vehicle, a building, or other structure) of one or more vehicles and/or an origin and/or destination of the one or more vehicles. It should be understood that these examples are illustrative, and therefore should not be construed as being limiting in any way.

The flight information can include, for example, information about a flight such as a departure time, a flight destination, takeoff runway information, landing runway information, departure gate information, arrival gate information, taxiing path information, combinations thereof, or the like. In some embodiments, for example, the sensor data 204 can include a photograph of an aircraft (e.g., captured by a camera on the ground support equipment 100). The photograph can be provided, in some embodiments, by the ground support equipment 100 and to the flight information server 208N. The flight information server 208N can determine, based on the photograph and/or based on extracted aircraft information from the photograph (e.g., a tail number for a photographed aircraft; a carrier associated with the photographed aircraft, and/or other information associated with the photographed aircraft), a flight number and/or aircraft path associated with the aircraft.

Thus, the flight information can include not only an origin, destination, current flight status, current location, and the like for a particular aircraft, but also a current task (e.g., landing, taxing, taking off, departing the gate, etc.), a current location, a current speed, a current trajectory, a current route, and a known or expected path of the aircraft. Thus, the flight information can be provided with aircraft path/status information, in some embodiments, though it is not necessarily the case in all embodiments. The flight information and/or aircraft path/status information can be used by the autonomous driving application 206 to disambiguate one or more detected aircraft, to determine if and/or how the aircraft is or will be moving, etc., as will be explained in more detail below. The aircraft path/status information also can include location updates of the aircraft associated with the aircraft path/status information. These location updates can include coordinates and/or relative location information as explained above. It should be understood that this example is illustrative, and therefore should not be construed as being limiting in any way.

The automatic dependent surveillance-broadcast information can include information about each aircraft at the airport or other facility. This information can include, but is not limited to, an aircraft type, an aircraft position, an aircraft speed, and an aircraft destination. It should be understood that this example is illustrative, and therefore should not be construed as being limiting in any way.

In some embodiments of the concepts and technologies disclosed herein, a photograph or other image of an aircraft can be taken or captured by one or more of the sensors 202 of the ground support equipment autonomous driving system 104 of the ground support equipment 100. The autonomous driving application 206 can be configured to analyze the photograph, in some embodiments, and to extract from the photograph, a cropped or masked image of the aircraft and/or a portion of the aircraft that is depicted in the photograph. The image of the aircraft or portion thereof, or the extracted aircraft information, can be packaged by the autonomous driving application 206 as sensor data 204 and transmitted, by the ground support equipment 100, to one or more of the data sources 208. The data sources 208 (e.g., the flight information server 208N) can be configured to generate contextual data 212, which can include aircraft path information, status of the aircraft, and/or other aspects of the path such as location, heading, speed, etc.

In some embodiments of the concepts and technologies disclosed herein, the autonomous driving application 206 can be configured to determine if the photographed aircraft (or jet blast associated with the aircraft) is expected to be an obstacle for the ground support equipment 100, and/or to determine if a current movement and/or path of the ground support equipment 100 should be modified based on the aircraft path and/or flight information. In various embodiments of the concepts and technologies disclosed herein, the autonomous driving application 206 can be configured to generate display data 214. The display data 214 can be rendered by one or more devices and presented to a user or other entity, for example a driver of the ground support equipment 100. In some embodiments, the display data 214 can be rendered by the autonomous driving application 206 to provide a graphical user interface on a display 216 of the ground support equipment autonomous driving system 104.

The graphical user interface (e.g., presented on the display 216) may be configured to provide, to the user or other entity, visual indications of, and/or information regarding, aircraft and/or other vehicles (e.g., ground support equipment) that may be located in a field of view of the user or other entity (e.g., the driver of the ground support equipment 100). The visual indications that can be included in the user interface may provide various types of information relating to the aircraft and/or other vehicles such as, for example, a type of vehicle or aircraft, a vehicle or aircraft identifier, a distance to vehicle or aircraft, a speed of the vehicle or aircraft, a destination and/or task and/or status of the vehicle or aircraft, combinations thereof, or the like.

In some embodiments, the autonomous driving application 206 also can be configured to determine if the detected vehicle or aircraft is an obstacle for the ground support equipment 100 on its current path and/or current route. For example, the autonomous driving application 206 can determine if the ground support equipment 100 should be rerouted, stopped, re-tasked, or the like, and one or more visual indications may be provided to a user or other entity to indicate whether the ground support equipment 100 may continue on its present route, stop, be rerouted, or be assigned a new task to avoid an obstacle. In some embodiments of the concepts and technologies disclosed herein, the autonomous driving application 206 can be configured to autonomously control the ground support equipment 100 in which the ground support equipment autonomous driving system 104 is installed.

For example, the autonomous driving application 206 may be configured to autonomously control or navigate the ground support equipment 100 along the airport apron and/or elsewhere based on the sensor data 204 and/or the contextual data 212. In particular, control instructions can be output to the vehicle control hardware 218 (labeled "vehicle control HW 218" in FIG. 2) of the ground support equipment autonomous driving system 104. The vehicle control hardware 218 can include, but is not limited to, a throttle controller, a brake controller, a steering controller, or the like. It should be understood that this example is illustrative, and therefore should not be construed as being limiting in any way.

According to various embodiments of the concepts and technologies disclosed herein, functionality of the autonomous driving application 206 and one or more of the data sources 208 can be provided, at least in part, by one or more neural networks and/or other artificial intelligence, which can be trained to provide the functionality illustrated and described herein. In some embodiments of the concepts and technologies disclosed herein, the autonomous driving application 206 and/or one or more of the data sources 208 can be trained by one or more training modules. For example, a training module can be configured to train the autonomous driving application 206 to navigate the ground support equipment 100 along an airport apron 102 or other area. The training module can be configured to train the ground support equipment autonomous driving system 104, in some embodiments, by developing heuristics based on data gathered from the task manager 208A, the location manager 208B, the automatic dependent surveillance-broadcast server 208C, the flight information server 208N, and/or the ground support equipment autonomous driving system 104.

The heuristics can be stored in one or more data storage devices such as memories, databases, or the like. For example, the training module may train a decision making module, an artificial intelligence, or a neural network, to provide the autonomous driving application 206 or another application or service, where this training can be completed using machine learning techniques to learn how to navigate the ground support equipment 100 along an airport apron 102 based on data from images, motion of the ground support equipment 100 and/or other vehicles and/or aircraft, location information, and/or other information (e.g., the sensor data 204 illustrated and described herein), as well as the contextual data 212 from the data sources 208. It should be understood that this example is illustrative, and therefore should not be construed as being limiting in any way.

In one contemplated example embodiment of this training and/or machine learning, captured image data from one or more image sensors (e.g., images or video frames captured by a camera of the ground support equipment autonomous driving system 104) can be processed and labeled, e.g., with contextual data 212 from the data sources 208. In some embodiments, subsequent frames of captured video may be further labeled with motion data (e.g., data from a motion sensor located at one or more vehicles), location data (e.g., GPS information of the one or more vehicles), weather data (e.g., sunny, overcast/cloudy, rainy, snowy, icy, foggy, warm, cold, etc.), and information on the time of day the image was captured (e.g., night, day, dawn, twilight, etc.).

The labels of captured images may be searched and referenced by the training module or other entities to train the decision making functionality of the autonomous driving application 206. The heuristics can be stored, in some embodiments, as can other information such as historical data (e.g., time series data, GPS information, aircraft information, vehicle information, airport maps, traffic information, weather information, etc.) obtained from various data sources 208, labeled captured images (e.g., images from one or more sensors 202 disposed at one or more vehicles, aircraft, and/or airport structures), and/or real-time data from the data sources 208. The heuristics may be referenced by the training module, or users, when training a decision making module. It should be understood that this example is illustrative, and therefore should not be construed as being limiting in any way.

Once trained, the autonomous driving application 206 can be configured to recognize objects in a received image captured within a field of view of one or more optical sensors at the ground support equipment 100. The autonomous driving application 206 can be configured to categorize the recognized object as a person (e.g., ground crew, passenger, pilots, etc.), a type of ground support equipment (e.g., a tug, a dolly, a cart, a fuel truck, a rescue vehicle, a conveyor belt vehicle, a truck, etc.), and/or an aircraft. The autonomous driving application 206 can be configured to obtain or determine paths of the recognized objects and can determine, based on the path of the ground support equipment 100, whether the recognized object (obstacle), will be clear of the path of the ground support equipment 100. Thus, the autonomous driving application 206 can determine if the ground support equipment 100 should continue along its route and/or path, or if a change to the route and/or path should be made.

In various embodiments of the concepts and technologies disclosed herein, the autonomous driving application 206 can be configured to receive the contextual data 212, which can provide real-time information of all aircraft and vehicles (e.g., ground support equipment, trucks, aircraft, etc.) equipped with automatic dependent surveillance-broadcast sensors and/or location sensors. Based on the obtained or received contextual data 212 indicating locations and paths of vehicles and aircraft traveling along the airport apron 102, the autonomous driving application 206 can update or adjust a navigation route and/or path associated with the ground support equipment 100.

For example, the autonomous driving application 206 may obtain an image from a camera or other sensors 202 of the ground support equipment autonomous driving system 104 and determine if an aircraft is included in the image. In some embodiments, the autonomous driving application 206 can be configured to determine if an aircraft is identified within a pixel region of a predetermined size (e.g., twenty pixels, thirty pixels, etc.). The autonomous driving application 206 and/or one of the data sources 208 can be configured to determine the aircraft type, aircraft location, aircraft path, and the location of the ground support equipment 100. Based on these and/or other information as illustrated and described herein, the autonomous driving application 206 can be configured to determine a distance between the ground support equipment 100 and the aircraft (e.g., by determining that the twenty or thirty pixels within the image is equivalent to and/or corresponds to a determined distance). As such, the autonomous driving application 206 can continue learning during driving and/or movements and contextual data 212 may not be required in the future based on the identified aircraft and the size of the corresponding pixels in the captured image. Thus, it can be appreciated that the autonomous driving application 206 can be trained to recognize obstacles in captured imagery with or without the contextual data 212, in some embodiments. It should be understood that this example is illustrative, and therefore should not be construed as being limiting in any way.

According to various embodiments of the concepts and technologies disclosed herein, the ground support equipment autonomous driving system 104 (or the autonomous driving application 206) can be configured to update and/or inform a driver or other entity regarding routing decisions, obstacle avoidance, delays, and the like. Thus, various embodiments of the ground support equipment autonomous driving system 104 can be configured to generate display data 214, as noted above. The display data 214 can include data that, when rendered by a computing device, can create a user interface for presentation on the display 216. The user interface can be provided to provide routing, location, obstacle, and/or other information (e.g., flight information, etc.).

According to various embodiments of the concepts and technologies disclosed herein, the display 216 can include a touch-sensitive or non-touch-sensitive display, a heads up display, a virtual reality headset display, a display inside of a helmet or glasses, or other types of displays. Thus, it can be appreciated that the display 216 can include a light-emitting diode ("LED") display; an organic light-emitting diode ("OLED") display; a liquid crystal display ("LCD"); a plasma monitor; a cathode ray tube ("CRT") display; other types of displays; combinations thereof, or the like. As such, it can be appreciated that while the display 216 is illustrated as a component of the ground support equipment autonomous driving system 104, the display 216 may be remote from the ground support equipment autonomous driving system 104 and may interface with the ground support equipment autonomous driving system 104 wirelessly and/or via wired connections, in some embodiments.

The user interfaces that can be displayed on the display 216 can include, but are not limited to, augmented reality displays (e.g., where user interface elements are displayed as overlaid user interface elements on a video feed or camera image), virtual reality displays, informational displays, and/or other types of displays as are generally known. Some example user interfaces are illustrated and described herein with reference to FIGS. 7A-7E. Because the concepts and technologies disclosed herein can be used to present information in a variety of manners, it should be understood that these illustrated examples and other described examples are illustrative, and therefore should not be construed as being limiting in any way.

In an example embodiment of a process for operating ground support equipment 100 that includes a ground support equipment autonomous driving system 104, the ground support equipment 100 may begin at a charging station or parking space. The ground support equipment 100 may be assigned one or more tasks. The first task may include navigating to a belt conveyer to pick up luggage. In areas of low light, the ground support equipment 100 may use one of the sensors 202 (e.g., wireless sensors, infrared, or the like) to navigate (e.g., to detect signals transmitted from task locations, to detect roads, etc.).

After picking up the luggage, the ground support equipment 100 may be tasked to navigate from the belt conveyor to a particular aircraft 302 to deliver the luggage. To navigate to the aircraft 302, the ground support equipment 100 may perform a number of operations and may be required to avoid a number of obstacles. For example, the ground support equipment 100 can begin to navigate across the airport apron 102 and may detect potential pedestrians, aircraft, buildings, and other ground support equipment 100 along its path or route. The ground support equipment 100 may decide whether to wait for the pedestrians, aircraft 302, and/or other ground support equipment 100 to pass the path or route; to continue without waiting; to change routes or paths; or the like as illustrated and described herein.

The ground support equipment autonomous driving system 104 of the ground support equipment 100 can use one or more of the sensors 202 to detect pedestrians, aircraft 302, other ground support equipment 100, and/or other obstacles along its path and/or can maintain the ground support equipment 100 along designated paths/roads along the airport apron 102.

When approaching an obstacle, information can be transmitted from the sensors 202 to the autonomous driving application 206 and/or to one or more of the data sources 208. Autonomous driving application 206 and/or one or more of the data sources 208 can determine whether the path of the ground support equipment 100 is unobstructed or obstructed. Decisions as to whether to stop, go, reroute, or the like can be made by the autonomous driving application 206 and/or the data sources 208 and implemented by the ground support equipment autonomous driving system 104 to autonomously navigate the ground support equipment 100 to the location of its next task. In various embodiments, the display data 214 can be generated to generate a graphical user interface for presentation on the display 216. The display 216 can be configured to inform a driver of whether to proceed, to wait for an obstacle to pass, to reroute, or the like, and can provide an override option in some embodiments. It should be understood that this example is illustrative, and therefore should not be construed as being limiting in any way.

In some embodiments of the concepts and technologies disclosed herein, some or all functionality of the autonomous driving application 206 can be offloaded to another computer. For example, the ground support equipment autonomous driving system 104 can be configured to capture images and send the sensor data 204 to the data sources 208. The data sources 208 can include functionality similar to the functionality of the autonomous driving application 206 illustrated and described herein. Thus, the data sources 208 can be configured to determine the paths of vehicles and/or locations of obstacles, and to issue driving decisions to the ground support equipment 100 for implementation and/or presentation to the driver. As such, it should be understood that the functionality of the autonomous driving application 206 can be offloaded from the ground support equipment 100 in some embodiments to other devices and/or locations located at or remote from the ground support equipment 100 without departing from the scope of this disclosure.

Figure 3A:
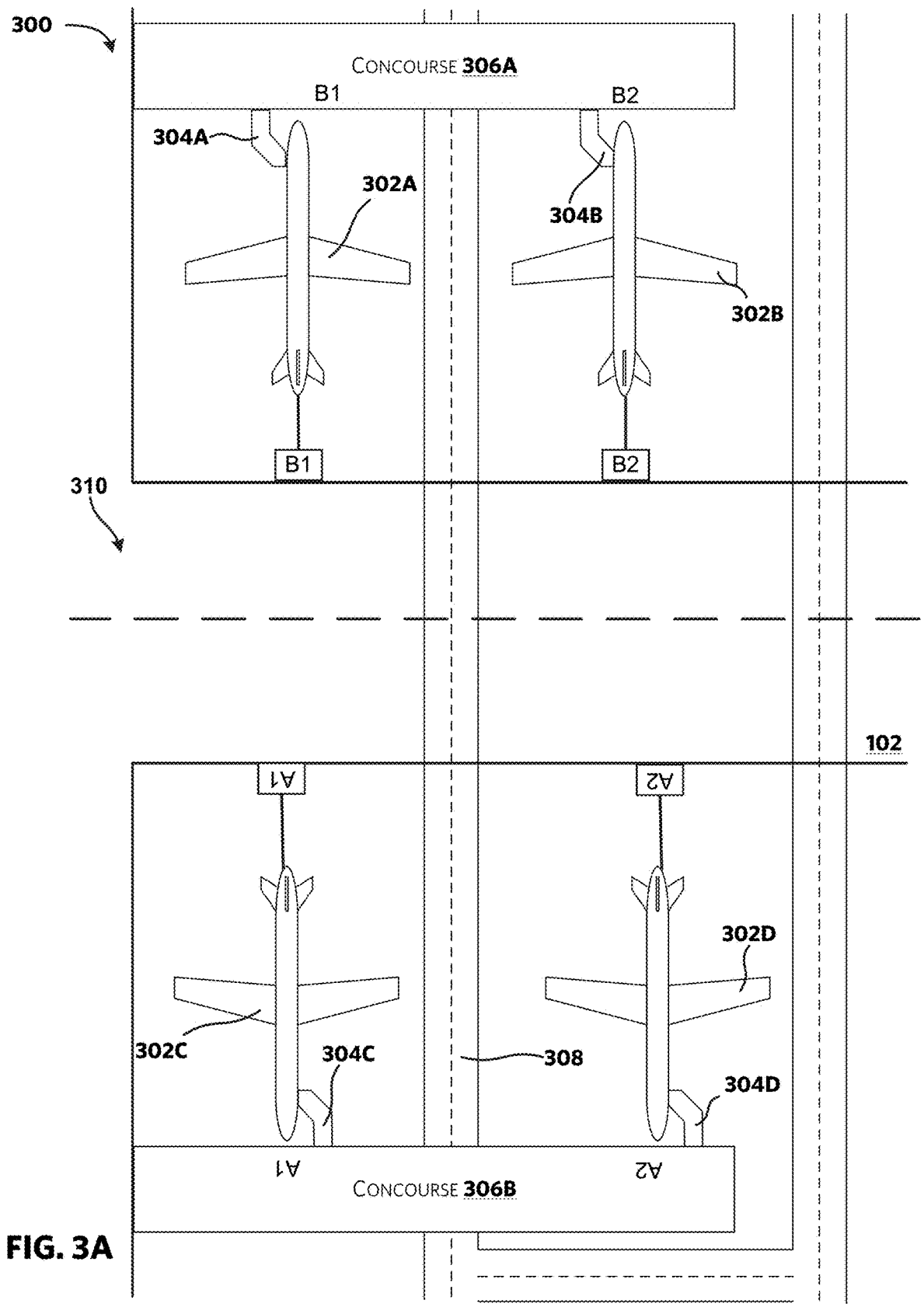
FIGS. 3A-3E are line drawings illustrating an example operating environment and some example navigation scenarios for various embodiments of the concepts and technologies disclosed herein.

Turning now to FIGS. 3A-3E, an example operating environment 300 for various embodiments of the concepts and technologies disclosed herein is illustrated. After describing the various components of the operating environment 300, an example scenario for autonomously navigating ground support equipment 100 using a ground support equipment navigation system 200 will be described. Referring first to FIG. 3A, the operating environment 300 is illustrated as an airport or similar facility. It should be understood that this example is illustrative, and therefore should not be construed as being limiting in any way.

The example operating environment 300 includes four aircraft 302A-D (hereinafter collectively and/or generically referred to as "aircraft 302"). The aircraft 302 are depicted in FIG. 3A as being located at respective gates 304A-D (hereinafter collectively and/or generically referred to as "gates 304") at two concourses or terminals ("concourses) 306A-B (hereinafter collectively and/or generically referred to as "concourses 306"). It can be appreciated that the concourses 306 can include many gates 304 and/or aircraft 302, as is generally understood.

The operating environment 300 also includes the airport apron 102, which can extend to, around, through, and/or under the one or more concourse 306. The airport apron 102 can include markings for roadways 308, which can be used by ground support equipment 100 and/or other vehicles; aircraft taxiways 310, which can be used by aircraft 302 to taxi to, from, and/or between runways and/or concourses 306; runways (not visible in FIGS. 3A-3E); combinations thereof; or the like. It should be understood that the illustrated operating environment 300 is illustrative and should not be construed as being limiting in any way.

Figure 3B:
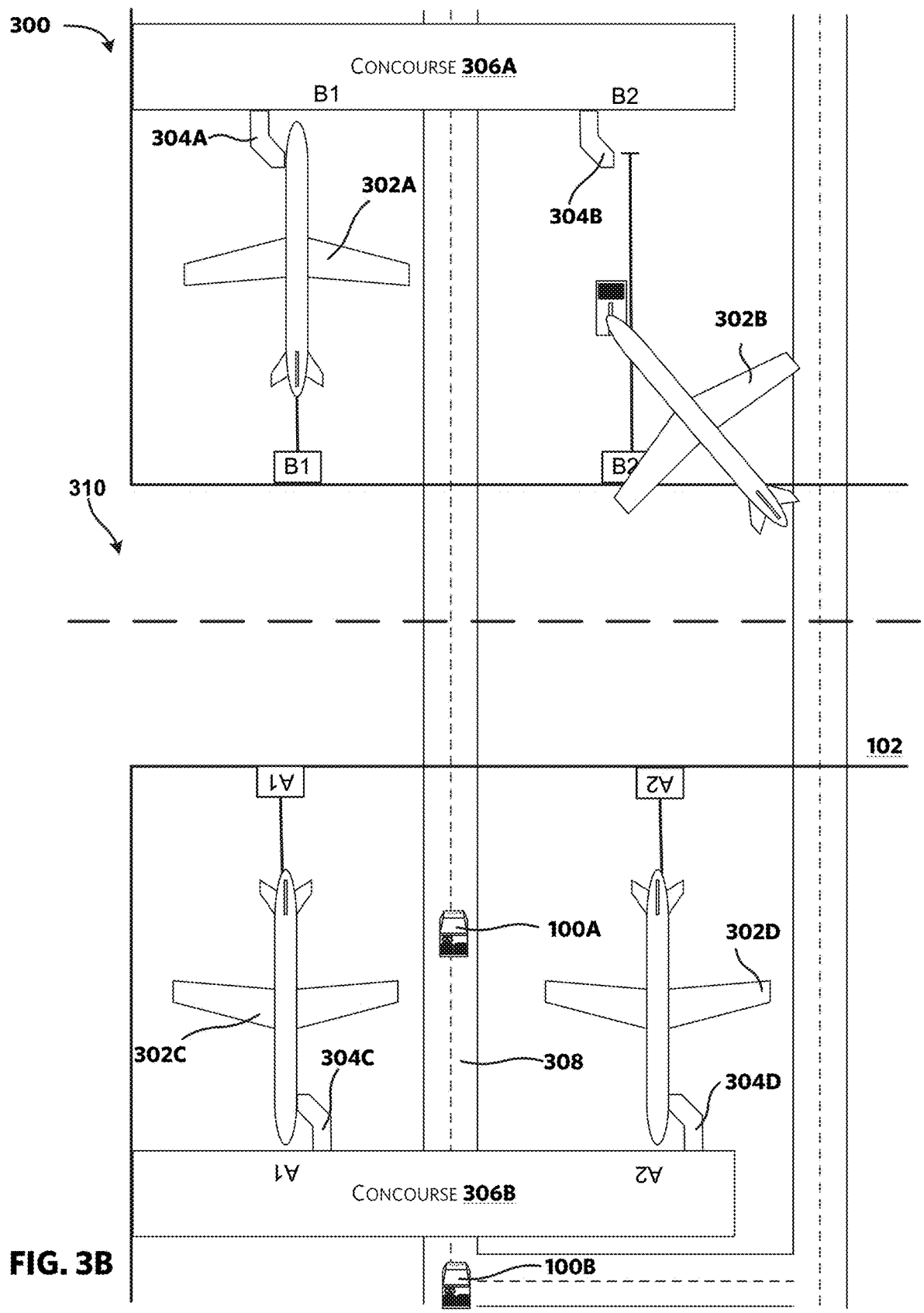

Turning now to FIG. 3B, a first ground support equipment 100A is visible driving up the roadway 308 to traverse the airport apron 102. A second ground support equipment 100B is visible driving up the same roadway 308 to traverse the airport apron 102. Meanwhile, the aircraft 302B is illustrated as being pushed back (e.g., disembarking) from the gate 304B, for example, to begin taxiing to a runway for takeoff. As can be seen in FIG. 3B, the aircraft 302B may taxi into the path (e.g., along the roadway 308) that may be expected for the first ground support equipment 100A and/or the second ground support equipment 100B. As is generally known, ground support equipment 100 can be prohibited from deviating from a designated portion of the airport apron 102 such as, for example, the roadway 308. Thus, it is possible that the progress of the first ground support equipment 100A and the second ground support equipment 100B in traversing the airport apron 102 may be impeded by the aircraft 302B. It should be understood that this example is illustrative, and therefore should not be construed as being limiting in any way.

Figure 3C:
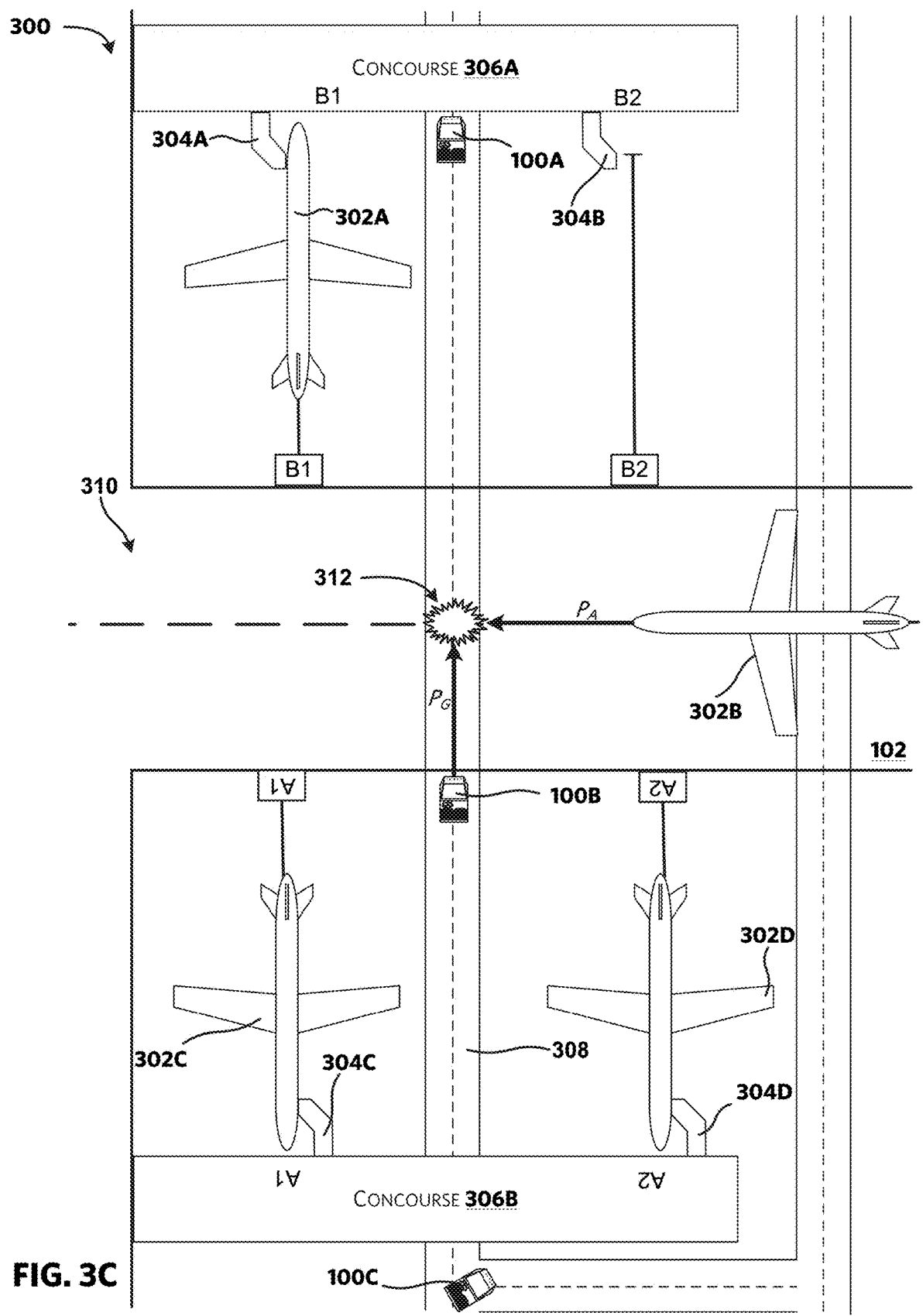

Turning now to FIG. 3C, the aircraft 302B is now moving along the taxiway 310. The first ground support equipment 100A successfully traversed the taxiway 310 before the aircraft 302B approached the roadway 308, but the second ground support equipment 100B is illustrated as having its progress along the roadway 308 obstructed by an expected future position of the aircraft 302B. In particular, the path $P_A$ of the aircraft 302B and the path $P_G$ of the second ground support equipment 100B are illustrated as potentially colliding at an obstruction/collision point 312. Thus, the second ground support equipment 100B may be forced to stop and wait for the aircraft 302B to clear the roadway 308, thereby potentially delaying the second ground support equipment 100B. Depending on a current task associated with the second ground support equipment 100B, such a delay may affect the customer experience (e.g., delivery of luggage or cargo may be delayed or may fail to meet commitments). Embodiments of the concepts and technologies disclosed herein can be employed to avoid such delays and/or failure to meet commitments, as illustrated and described herein.

Meanwhile, a third ground support equipment 100C has approached the area depicted in FIG. 3C, and the associated ground support equipment autonomous driving system 104 has instructed the third ground support equipment 100C to avoid the obstruction/collision point 312 due to a developing backup of traffic at that point. As such, the third ground support equipment 100C is illustrated as turning to take an alternative roadway 308 or an alternative portion of the roadway 308 to traverse the airport apron 102. It should be understood that this example is illustrative, and therefore should not be construed as being limiting in any way.

Figure 3D:
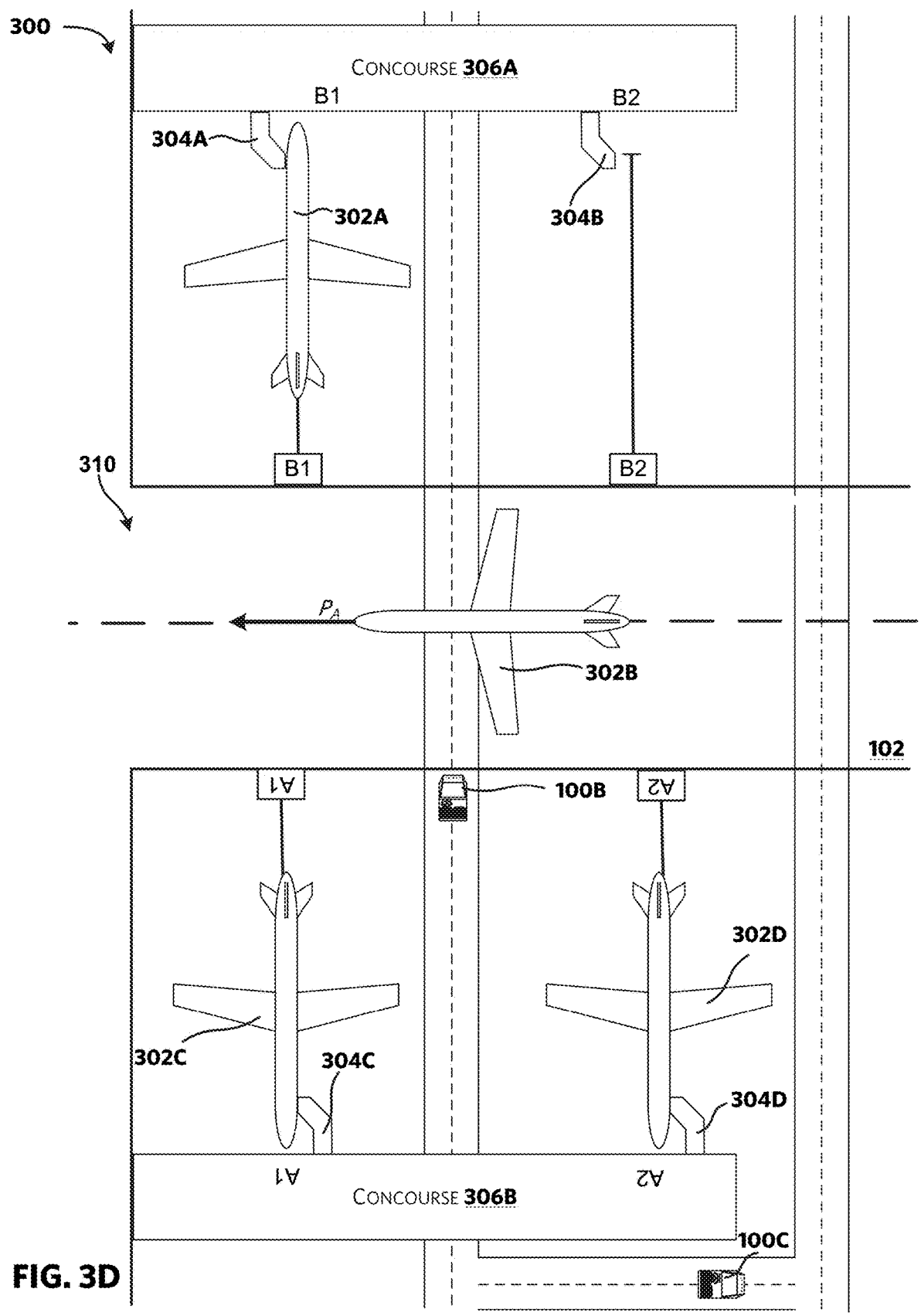

Turning now to FIG. 3D, the second ground support equipment 100B is illustrated as still waiting for the aircraft 302B to traverse the roadway 308, while the third ground support equipment 100C has turned to use another roadway 308 (or portion of the roadway 308) to avoid any delays caused by the aircraft 302B crossing the roadway 308. In the illustrated embodiment, the ground support equipment autonomous driving system 104 of the third ground support equipment 100C may have determined that the second ground support equipment 100B is stopped or has been slowed due to the aircraft 302B traveling along the taxiway 310. This determination may have been indicated to the third ground support equipment 100C by the contextual data 212, which may have been obtained in response to an image including the aircraft 302B. It should be understood that this example is illustrative, and therefore should not be construed as being limiting in any way.

In response to determining that there is congestion along the route, the third ground support equipment 100C has been rerouted along other roadways 308 (or portions of the roadway 308) to reach its intended destination. In some embodiments of the concepts and technologies disclosed herein, the third ground support equipment 100C can be autonomously controlled, while in some embodiments, instructions to reroute the third ground support equipment 100C may be displayed on a graphical user interface and implemented by a driver or other entity associated with the third ground support equipment 100C. It should be understood that this example is illustrative, and therefore should not be construed as being limiting in any way.

Figure 3E:
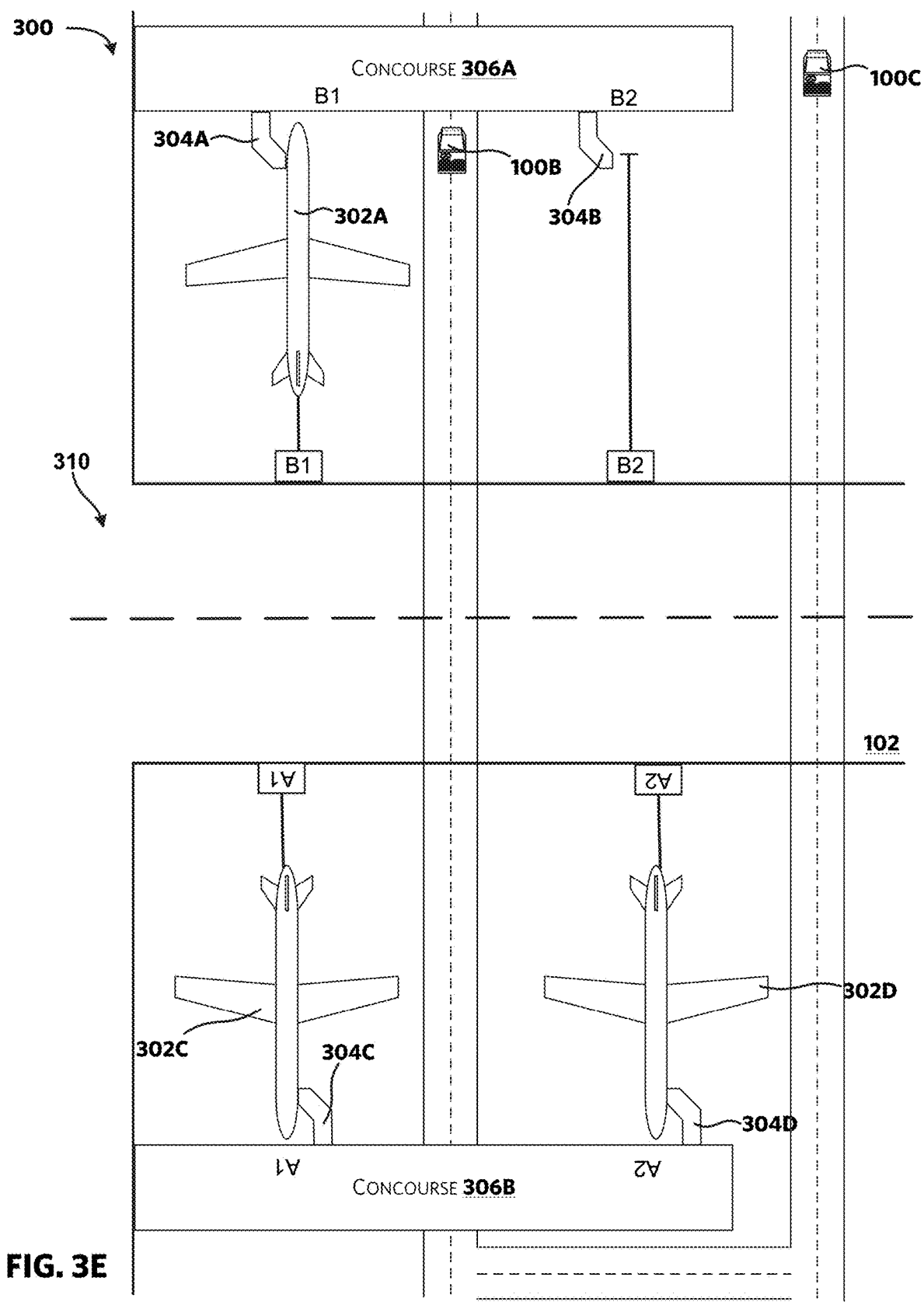

Turning now to FIG. 3E, it can be appreciated that the first ground support equipment 100A has traversed the airport apron 102 (or a portion thereof), and that the third ground support equipment 100C has also traversed the airport apron 102 (or a portion thereof). The second ground support equipment 100B, however, was delayed by the aircraft 302B, while the third ground support equipment 100C was not delayed as much as the second ground support equipment 100B because of the rerouting illustrated and described above. Thus, it can be appreciated that embodiments of the concepts and technologies disclosed herein can be used to avoid delays and/or obstructions, or to at least reduce the impact from the delays or obstructions. It should be understood that this example is illustrative, and therefore should not be construed as being limiting in any way.

The example scenario illustrated in FIGS. 3A-3E has described embodiments of the concepts and technologies disclosed herein in which a delay is imposed on the route or path of a second ground support equipment 100B due to an obstruction, and where a route or path of a third ground support equipment 100C has been changed due to the obstruction. It should be understood, however, that other embodiments of the concepts and technologies disclosed herein can respond to perceived or expected delays and/or obstructions in other manners. In particular, the ground support equipment autonomous driving system 104 of one of more types of ground support equipment 100 can be configured to reassign and/or switch tasks based on obstructions or delays.

Using the general layout of FIGS. 3A-3E, an example scenario will be described. In the example scenario, the first ground support equipment 100A can be located at the first concourse 306A and can be assigned a task to drive to the second concourse 306B and unload luggage from the aircraft 302C. Meanwhile the second ground support equipment 100B can be located at the second concourse 306B and may be assigned a task to drive from the second concourse 306B to the first concourse 306A to provide support at the second gate 304B for an arriving aircraft 302. The taxiway 310 between the concourses 306, however, may be blocked by an aircraft 302 as shown in FIG. 3D. Instead of delaying the first ground support equipment 100A and the second ground support equipment 100B, the tasks assigned to the first ground support equipment 100A and the second ground support equipment 100B can be swapped/switched, thereby avoiding the delay and/or obstacle altogether. As explained above, the data sources 208 (e.g., the task manager 208A) can make such changes, in some embodiments, and provide that task information to the first ground support equipment 100A and the second ground support equipment 100B. As such, it can be appreciated that embodiments of the concepts and technologies disclosed herein can be used to avoid obstacles and/or delays in multiple manners. It should be understood that this example is illustrative, and therefore should not be construed as being limiting in any way.

FIGS. 3A-3E illustrate three instances of ground support equipment 100, one airport apron 102, four aircraft 302, four gates 304, two concourses 306, one roadway 308, and one taxiway 310. It should be understood, however, that various implementations of the operating environment 300 can include one, two, three, or more than three instances of ground support equipment 100; one or more than one airport apron 102; zero, one, or more than one aircraft 302; zero, one, or more than one gates 304; zero, one, or more than one concourse 306; zero, one, or more than one roadway 308; and/or zero, one, or more than one taxiway 310. As such, the illustrated embodiment should be understood as being illustrative, and should not be construed as being limiting in any way.

Turning now to FIGS. 4A-4F, additional aspects of the concepts and technologies disclosed herein will be described. In particular, FIGS. 4A-4F illustrate some example embodiments for extracting aircraft information from captured images (e.g., aircraft images), according to an example embodiment of the concepts and technologies disclosed herein. In some embodiments of the concepts and technologies disclosed herein, as explained above, the autonomous driving application 206 can be configured to extract, from a captured image, aircraft information that can be provided to one or more of the data sources 208 (e.g., the flight information server 208N) to obtain flight information and/or aircraft path/status information. In some other embodiments of the concepts and technologies disclosed herein, as explained above, the autonomous driving application 206 can be configured to provide images to one or more of the data sources 208 (e.g., the flight information server 208N), and the flight information server 208N can be configured to mask and/or extract data from the images as illustrated and described herein with reference to FIGS. 4A-4F. As such, it should be understood that the illustrated and described embodiments are illustrative and should not be construed as being limiting in any way.

Figure 4A:
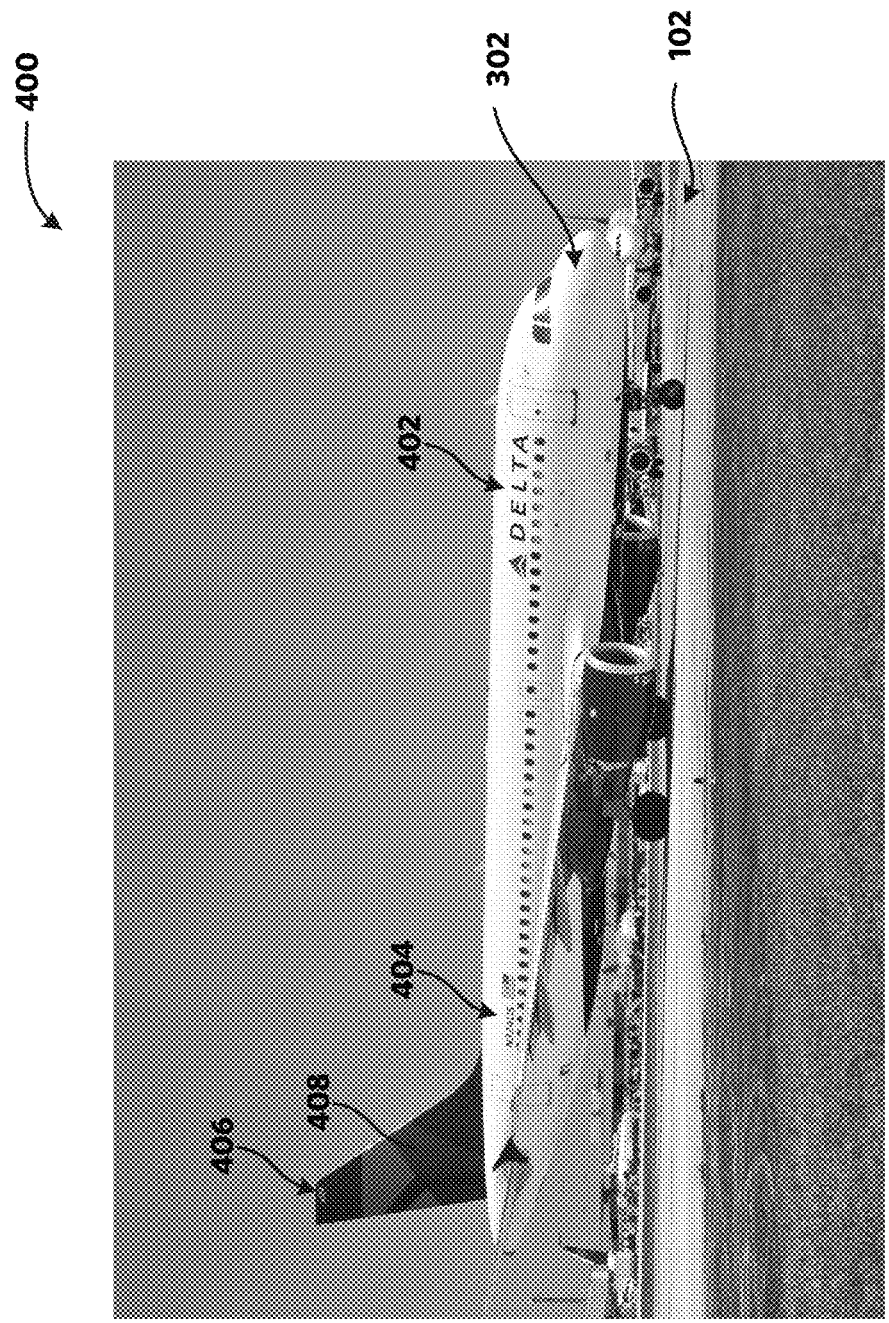
FIGS. 4A-4F are photographs illustrating various aspects of aircraft recognition and identification, according to various example embodiments of the concepts and technologies disclosed herein.

As explained above, the functionality of the autonomous driving application 206 and/or the flight information server 208N may be implemented as a neural network, artificial intelligence model, machine learning model, and/or a reinforcement model that can be trained and/or executed by a processor to perform the various operations illustrated and described herein for identifying an aircraft 302 from an image 400. In FIG. 4A, an example of the image 400 (which includes an aircraft 302) is shown. The image 400 also may be referred to herein or in the claims as an "environment image" or "airport image." It can be appreciated with reference to the description herein that the image 400 can be captured by one or more sensors 202 (e.g., an optical sensor) of the ground support equipment autonomous driving system 104 included in the ground support equipment 100. It should be understood that this example is illustrative, and therefore should not be construed as being limiting in any way.

As shown in the image 400, the aircraft 302 is moving along an airport apron 102. Markings on the aircraft 302 can include a name and/or logo that can indicate a carrier (referred to hereinafter as "carrier indicators 402"), e.g., Delta Air Lines in the example shown. The markings on the aircraft 302 also can include livery (e.g., colors, logos, color schemes, fonts, and/or patterns that the autonomous driving application 206 and/or flight information server 208N can be trained to recognize as being associated with a particular carrier); a registration number 404; and a tail number 406. The autonomous driving application 206 and/or flight information server 208N also can be configured to detect, e.g., based on shape recognition and/or the like, a manufacturer and/or model of one or more aircraft 302.

According to various embodiments of the concepts and technologies disclosed herein, the autonomous driving application 206 and/or flight information server 208N can be configured to process the image 400 using various algorithms and/or processes such as edge detection, thresholding, padding, skewing, mean-subtraction, inversion, posterization, and/or other processes to detect lines of the aircraft 302 and/or to recognize detected lines as corresponding to an aircraft 302, though this is not necessarily the case in all embodiments. It can be appreciated that the autonomous driving application 206 and/or flight information server 208N can be configured to maintain or access a library of aircraft shapes (and/or other shapes such as ground crew shapes, vehicle shapes, etc.) to recognize the aircraft 302 in the image 400.

In some embodiments, the autonomous driving application 206 and/or flight information server 208N can be trained to recognize one or more portions of an aircraft 302 that may be easily distinguished from other structures at or near an airport apron 102. For example, the autonomous driving application 206 and/or flight information server 208N may be trained to recognize the shape of a tail 408 of an aircraft 302, rather than the entire shape of the aircraft 302, in some embodiments. Alternatively, the autonomous driving application 206 may be trained to recognize one or more rows of windows as indicating an aircraft 302. Because aircraft 302 can be recognized in other manners, it should be understood that these examples are illustrative, and therefore should not be construed as being limiting in any way. At any rate, when an aircraft 302 is detected in the image 400, the autonomous driving application 206 and/or flight information server 208N can be configured to perform various masking and/or subtraction processes to extract the aircraft information from the image 400.

Figure 4B:
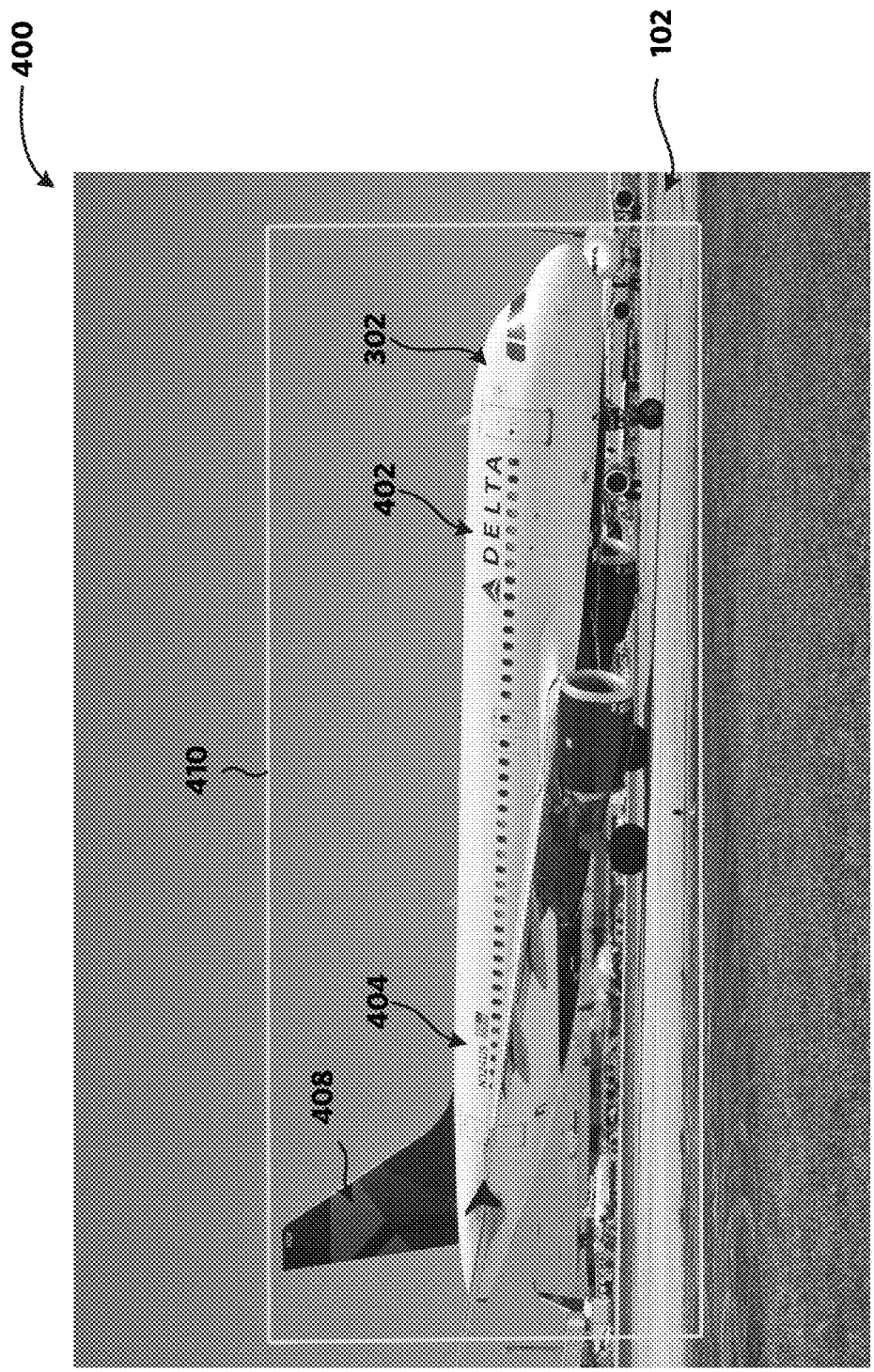

For example, turning to FIG. 4B, the autonomous driving application 206 and/or flight information server 208N can be configured to identify the aircraft 302 and create a bounding box 410 around the aircraft 302 in the image 400. The bounding box 410 can be used for user interfaces (as will be explained in more detail below), used for tracking the aircraft 302 in subsequent images 400, and/or used to apply masks and/or other processes on the image 400 to extract needed or desirable information. In some embodiments, the image 400 can be output to the display 216 and the bounding box 410 can be included to draw the attention of the driver or other user to the presence of the aircraft 302. It should be understood that the bounding box 410 shown in FIG. 4B is purely illustrative, as some embodiments of the concepts and technologies disclosed herein can include other shapes of bounding boxes 410. As such, it should be understood that this example is illustrative, and therefore should not be construed as being limiting in any way.

Figure 4C:

Turning to FIG. 4C, for example, an alternative embodiment of the bounding box 410 is illustrated, according to an illustrative embodiment. In particular, FIG. 4C illustrates a polygonal bounding box 410 that, as shown in FIG. 4C, is configured to more closely follow boundaries of geometry/shape of the aircraft 302. In some embodiments of the concepts and technologies disclosed herein, using a polygonal bounding box 410 such as that shown in FIG. 4C can exclude "noise" and/or unimportant portions of a photograph (e.g., portions of the photograph that are not part of an aircraft 302 such as grass, runways, sky, buildings, etc.). For example, the polygonal bounding box 410 can omit, from a photograph such as the image 400, portions of the photograph depicting runways, grass, buildings, etc. In some embodiments, parts of an aircraft 302 also can be deliberately omitted (e.g., passenger windows, landing gear, etc.) based on assumption that these and/or other portions of the aircraft 302 may be unimportant for purposes of identifying the aircraft 302, etc. It should be understood that this example is illustrative, and therefore should not be construed as being limiting in any way.

In various embodiments of the concepts and technologies disclosed herein, the polygonal bounding box 410 can be created as a result of training In various embodiments of the concepts and technologies disclosed herein, the autonomous driving application 206 and/or flight information server 208N can be trained to recognize aircraft shapes (e.g., by recognizing a tail 408 or other shape of the aircraft 302), thereby enabling the autonomous driving application 206 and/or flight information server 208N to bound the aircraft 302 with the bounding box 410. Such an approach can enable masking, subtraction, extraction, and/or other image processing processes to capture the pixels of the image 400 that correspond to an aircraft 302. It should be understood that this example is illustrative, and therefore should not be construed as being limiting in any way.

Figure 4D:
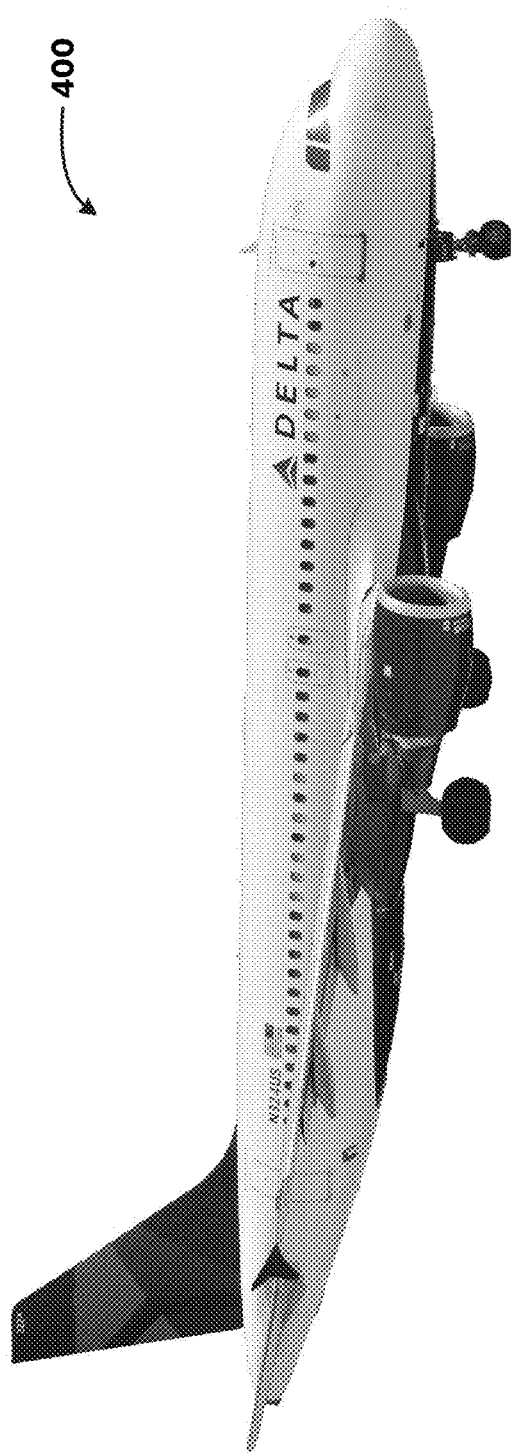

As shown in FIG. 4D, various masking, extraction, and/or edge detection processes can be performed within the bounding box 410 of FIGS. 4B and/or 4C to select and/or extract the aircraft 302 from the image 400, in some embodiments. This can be useful when sending the image 400 to other entities, as it may reduce the time to detect and/or recognize the aircraft 302, though this is not necessarily the case. Because the bounding box 410 and/or the extraction shown in FIGS. 4B-4D are optional, it should be understood that this example is illustrative, and therefore should not be construed as being limiting in any way.

Figure 4E:
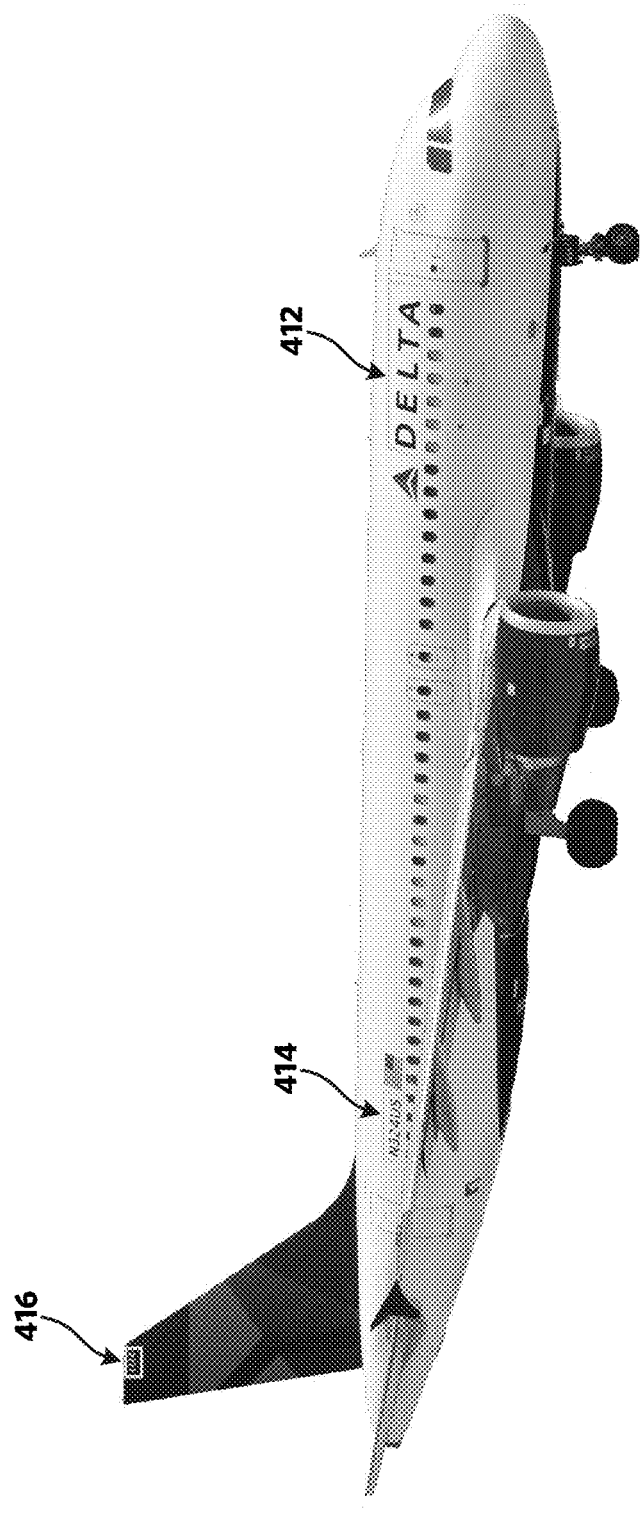

Turning to FIG. 4E, the autonomous driving application 206 and/or flight information server 208N can be configured to identify the carrier operating the aircraft 302, a registration number associated with the aircraft 302, a tail number associated with the aircraft 302, and/or other features (e.g., logos, livery, insignia, carrier names, etc. on the tail and/or body of the aircraft) of the aircraft 302 that may aid in identifying the aircraft 302 and/or determining its flight information. The autonomous driving application 206 and/or flight information server 208N can, in some embodiments, mask the image 400 of the aircraft 302 again using bounding boxes 412, 414, 416, respectively, to extract the carrier name, registration number, and/or tail number, respectively, though this is not necessarily the case.

Collectively referring to FIGS. 4A-4E, it can be appreciated that the autonomous driving application 206 and/or flight information server 208N can determine the type of aircraft, e.g., a manufacturer and/or model of the aircraft 302 based on a detected a shape of the aircraft 302 and/or one or more components of the aircraft 302. The autonomous driving application 206 and/or flight information server 208N can detect the tail number from the aircraft 302, for example, by recognizing the tail 408 and searching for text on the tail 408. The autonomous driving application 206 and/or flight information server 208N can identify the registration number of the aircraft 302 by searching for text in the correct format and/or that is located at the appropriate location on the body of the aircraft 302.

The autonomous driving application 206 and/or flight information server 208N can be configured to use the detected information to determine destination information of the aircraft 302 (e.g., origin, destination, taxiway, runway, gate number, concourse, departure time, arrival time, status, combinations thereof, or the like). For example, the autonomous driving application 206 and/or flight information server 208N may obtain the destination information from one or more databases, e.g., flight trackers, airport servers, etc., as explained above. Additionally, or alternatively, the autonomous driving application 206 and/or flight information server 208N can be configured to transmit the detected information to other entities (e.g., the task manager 208A, the location manager 208B, or other entities) to determine the destination information from one or more databases or other sources. The autonomous driving application 206 and/or flight information server 208N also can obtain, from various data sources 208, information that can indicate a travel speed of the aircraft 302 based on the detected information. Because additional and/or alternative information can be determined for the aircraft 302 based on the image 400 as illustrated and described herein, it should be understood that these examples are illustrative, and therefore should not be construed as being limiting in any way.

Figure 4F:
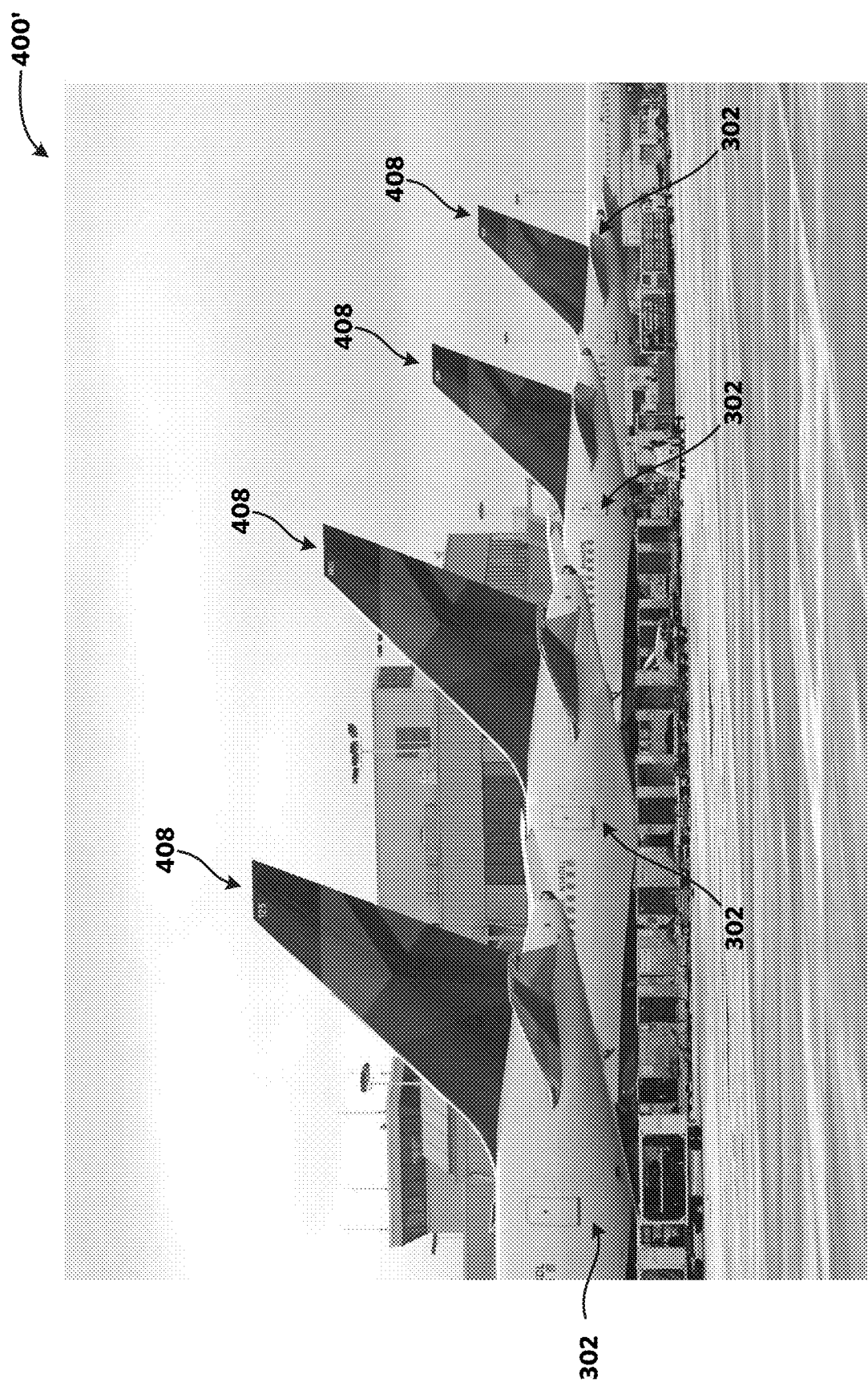

Turning now to FIG. 4F, additional aspects the concepts and technologies disclosed herein for identifying aircraft 302 and/or information relating to aircraft 302 will be described, according to an illustrative embodiment. In FIG. 4F, another image 400' is shown. In the image 400', multiple aircraft 302 are visible. In various embodiments of the concepts and technologies disclosed herein, the autonomous driving application 206 and/or flight information server 208N can be configured to identify one or more of the aircraft 302 by, for example, detecting the tail(s) 408 of the respective aircraft 302. It can be appreciated that the shape of a tail 408 of an aircraft 302 can be recognizable, particularly by a trained application such as the autonomous driving application 206 and/or the flight information server 208N. Thus, embodiments of the concepts and technologies disclosed herein can include recognizing one or more aircraft 302 in an image 400, 400'; one or more registration number(s) associated with the one or more aircraft 302; one or more tail number(s) associated with the one or more aircraft 302; and/or other features (e.g., logos, livery, insignia, carrier names, etc. on the tail and/or body of the aircraft) of the one or more aircraft 302; any of which may aid in identifying the one or more aircraft 302 and/or determining associated flight information for the one or more aircraft 302. It should be understood that this example is illustrative, and therefore should not be construed as being limiting in any way.

Figure 5:
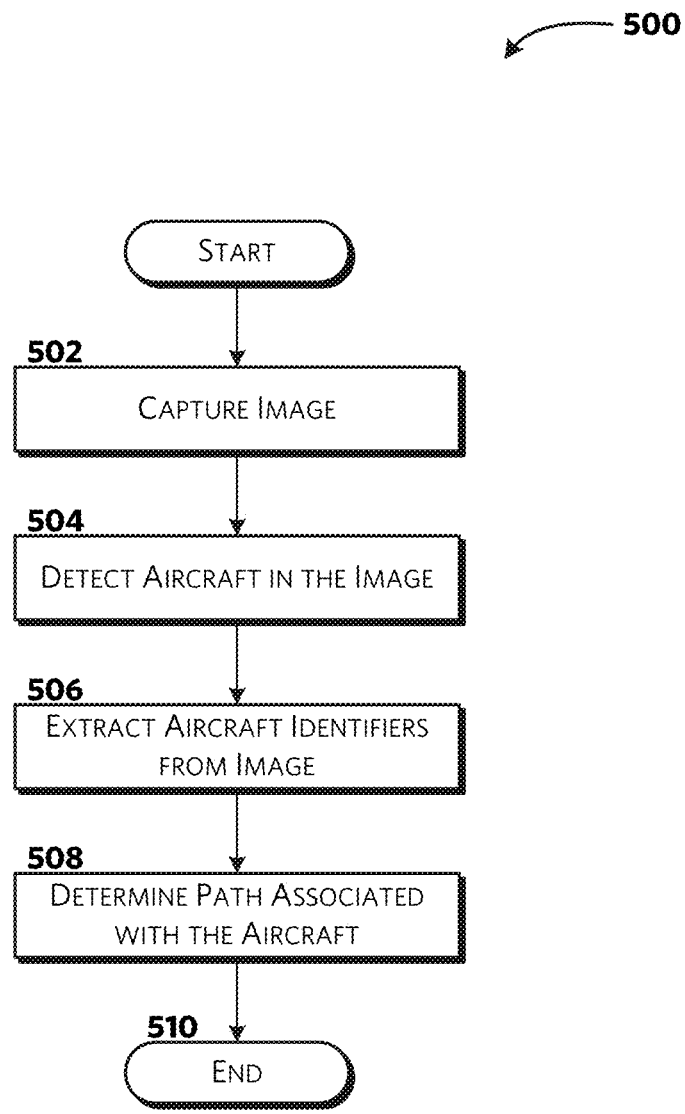
FIG. 5 is a flow diagram showing aspects of a method for identifying an aircraft and determining a path of the aircraft, according to an illustrative embodiment of the concepts and technologies described herein.

Turning now to FIG. 5, aspects of a method 500 for identifying an aircraft 302 and determining a path of the aircraft 302 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the ground support equipment autonomous driving system 104, to perform one or more operations and/or causing the processor to direct other components of the computing system or device to perform one or more of the operations.

For purposes of illustrating and describing the concepts of the present disclosure, the method 500 is described herein as being performed by the ground support equipment autonomous driving system 104 via execution of one or more software modules such as, for example, the autonomous driving application 206. It should be understood that additional and/or alternative devices (e.g., one or more of the data sources 208) can provide the functionality described herein via execution of one or more modules, applications, and/or other software including, but not limited to, the autonomous driving application 206. Thus, the illustrated embodiments are illustrative, and should not be viewed as being limiting in any way.

The method 500 begins at operation 502. At operation 502, the ground support equipment autonomous driving system 104 can capture an image such as, for example, the image 400. According to various embodiments of the concepts and technologies disclosed herein, the image captured in operation 502 can be captured using one or more cameras, radar devices, LIDAR devices, combinations thereof, or the like. As such, it can be appreciated that the image captured in operation 502 can include a photograph, video, and/or other types of images. In the described embodiment illustrated in FIG. 5, the image captured in operation 502 will be described as a photograph or a frame from a video. It should be understood that this example is illustrative, and therefore should not be construed as being limiting in any way.

From operation 502, the method 500 can proceed to operation 504. At operation 504, the ground support equipment autonomous driving system 104 can detect one or more aircraft 302 in the image (e.g., the image 400) captured in operation 502. As explained above, the ground support equipment autonomous driving system 104 can be trained (e.g., can include a neural network and/or other types of artificial intelligence) that can be trained to detect, in a photograph or other image, one or more aircraft 302. The ground support equipment autonomous driving system 104 can be configured to detect the aircraft by performing various processes on the image 400 captured in operation 502 (e.g., edge detection, filters, etc.) and determining if any shapes detected in the image 400 correspond to aircraft 302.

In some other embodiments, image processing is not required by the ground support equipment autonomous driving system 104 to detect aircraft 302. Rather, the ground support equipment autonomous driving system 104 can be configured to recognize aircraft in other manners such as, for example, detecting shapes, detecting colors and/or color patterns, detecting reflections, etc. In one contemplated embodiment, the layout of aircraft windows (e.g., in a single or multiple rows) can be detected by the ground support equipment autonomous driving system 104 to detect an aircraft 302 in an image 400. Because additional and/or alternative manners of detecting an aircraft 302 in an image 400 are possible and are contemplated, it should be understood that these examples are illustrative, and therefore should not be construed as being limiting in any way.

From operation 504, the method 500 can proceed to operation 506. At operation 506, the ground support equipment autonomous driving system 104 can extract aircraft identifiers associated with the one or more aircraft 302 identified in the image 400. In operation 506, the ground support equipment autonomous driving system 104 can be configured, e.g., via execution of the autonomous driving application 206 and/or other applications or modules, to identify various identifying characteristics associated with the aircraft 302 such as, for example, a carrier associated with the detected aircraft 302, livery (e.g., logos, insignia, color patterns, colors, etc.) associated with the detected aircraft 302, a tail number associated with the detected aircraft 302, a registration number associated with the detected aircraft 302, a manufacturer and/or model of the aircraft 302, and/or other identifying information.

In some embodiments of the concepts and technologies disclosed herein, the carrier associated with the detected aircraft 302 can be determined, for example, using text recognition or a neural network that can be trained to recognize carriers and/or other identifying information associated with the detected aircraft 302 such as logos, paint colors and/or patterns, combinations thereof, or the like. The registration number and/or tail numbers of the aircraft 302 can be determined, for example, using text recognition (e.g., optical character recognition) and/or other recognition technologies. The manufacturer and/or model of the aircraft 302 can be determined, in some embodiments, by identifying the shape and/or configuration of the aircraft 302 and/or by recognizing identifiers of the manufacturer and/or model of the aircraft 302. Thus, operation 506 can correspond to extracting, from the image 400, identifying information that can be used to identify the aircraft 302 and/or its mission, owner, etc.

In some embodiments, the functionality of operation 506 can be offloaded from the ground support equipment autonomous driving system 104. In particular, in some embodiments, as shown in FIG. 1, the sensor data 204 can include the image captured in operation 502, and this sensor data 204 can be provided to the data sources 208. The flight information server 208N and/or other data sources 208 can be configured to extract identifying information and/or to identify the various aspects of the aircraft as noted above, and to provide flight information to the ground support equipment autonomous driving system 104. Regardless of whether the ground support equipment autonomous driving system 104 extracts the identifying information or provides the image 400 to the data sources 208, it can be appreciated that the identification and/or extraction of identifying information as illustrated and described herein can be performed to identify the aircraft 302 and to use that identification to determine a path of the aircraft 302.

From operation 506, the method 500 can proceed to operation 508. At operation 508, the ground support equipment autonomous driving system 104 can determine a path associated with the aircraft 302. As noted above with reference to operation 506, the ground support equipment autonomous driving system 104 can submit the image 400 to the data sources 208 and receive the flight information in response to providing that image 400; or the ground support equipment autonomous driving system 104 can extract the identifying information from the image 400 and send the extracted aircraft information to the data sources 208 to obtain the flight information. In either and/or both embodiments, the ground support equipment autonomous driving system 104 can obtain, in operation 508, flight information associated with the aircraft 302 detected in operation 504.

According to various embodiments of the concepts and technologies disclosed herein, the flight information can include, for example, a destination of the aircraft, a departure time, an arrival time, designated gates, current flight status, current geographic location of the aircraft 302, combinations thereof, or the like. Based on these and/or other information, as well as air traffic control information or the like, the ground support equipment autonomous driving system 104 can determine a path associated with the aircraft 302. For example, the ground support equipment autonomous driving system 104 can determine that the aircraft 302 is taxiing to a known gate and therefore can determine, based on this information, a path of the aircraft 302 (while proceeding to the known gate). It should be understood that this is just one example embodiment of using flight information to determine a path of the aircraft 302.

In another contemplated embodiment of the concepts and technologies disclosed herein, the ground support equipment autonomous driving system 104 can be configured to recognize an aircraft from many if not any angle in the image 400. By comparing multiple images 400 (e.g., subsequent frames of a video or subsequent photographs, etc.), the ground support equipment autonomous driving system 104 may detect a turn or movement of the aircraft 302 in the images 400. This information alone, or in conjunction with the flight information, can be used to determine the path of the aircraft 302 as well. Because the path of the aircraft 302 can be determined in additional and/or alternative manners, it should be understood that this example is illustrative, and therefore should not be construed as being limiting in any way.

From operation 508, the method 500 can proceed to operation 510. The method 500 can end at operation 510.

Figure 6:
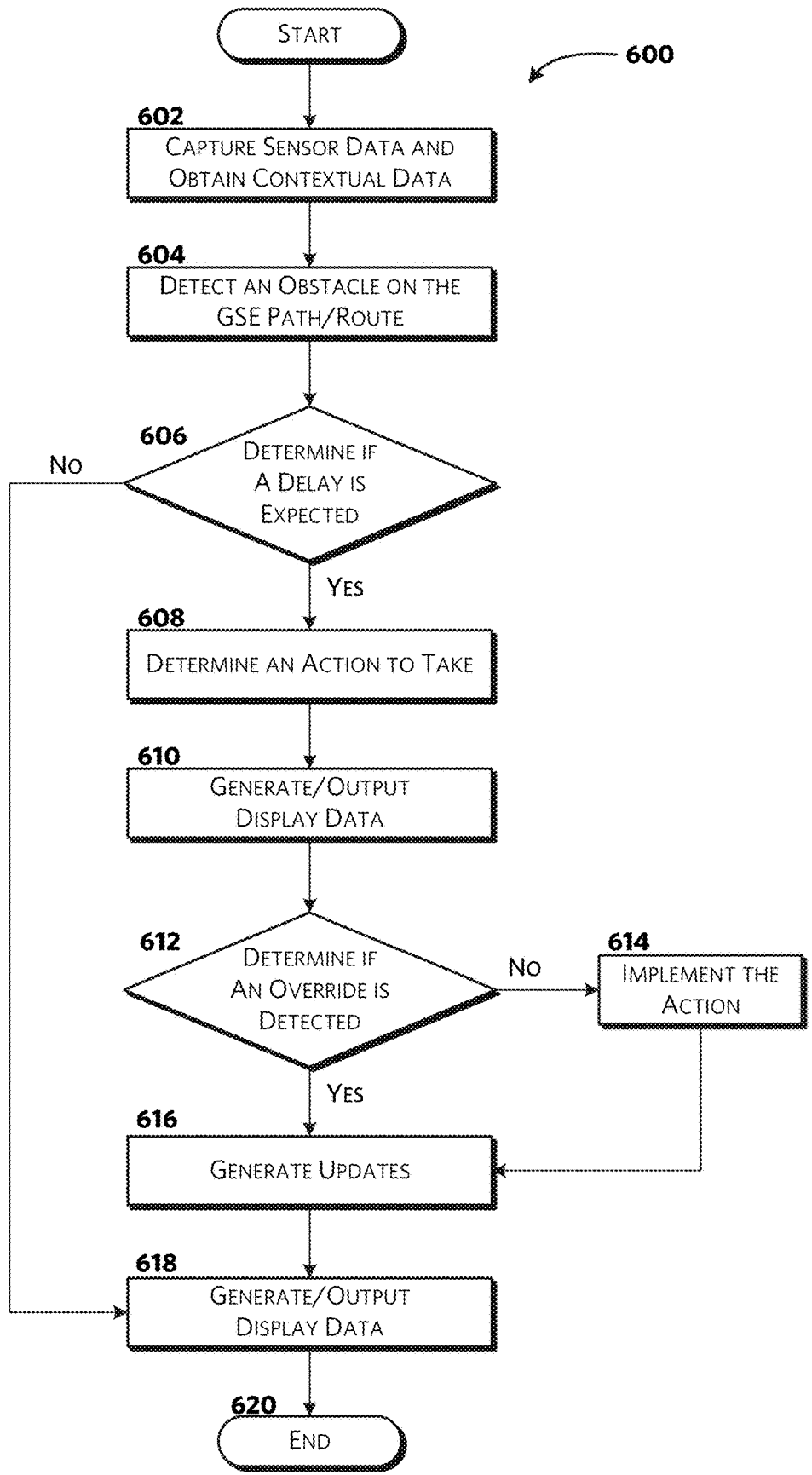
FIG. 6 is a flow diagram showing aspects of a method for enabling navigation of ground support equipment, according to an illustrative embodiment of the concepts and technologies described herein.

Turning now to FIG. 6, aspects of a method 600 for controlling navigation of ground support equipment 100 will be described in detail, according to an illustrative embodiment. For purposes of illustrating and describing the concepts of the present disclosure, the method 600 is described herein as being performed by the ground support equipment autonomous driving system 104 via execution of one or more software modules such as, for example, the autonomous driving application 206. It should be understood that additional and/or alternative devices (e.g., one or more of the data sources 208) can provide the functionality described herein via execution of one or more modules, applications, and/or other software including, but not limited to, the autonomous driving application 206. Thus, the illustrated embodiments are illustrative, and should not be viewed as being limiting in any way.

The method 600 begins at operation 602. At operation 602, the ground support equipment autonomous driving system 104 can capture sensor data such as the sensor data 204 and obtain contextual data such as the contextual data 212. As explained herein, the sensor data 204 can include images, location information, speed information, heading and/or trajectory information, temperature information, light information, proximity information, combinations thereof, or the like. Thus, the sensor data 204 obtained in operation 602 can be analyzed by the ground support equipment autonomous driving system 104 and/or other entities to determine a path of the ground support equipment 100 and/or to detect other entities in proximity to the ground support equipment 100.

Additionally, the contextual data 212 can include, for example, task information for various ground support equipment that may be located in proximity to the ground support equipment 100, paths and/or tasks associated with those ground support equipment entities, aircraft paths and/or status information, flight information, and/or other information as illustrated and described herein. The ground support equipment autonomous driving system 104 can be configured to determine, based on the sensor data 204 and the contextual data 212, an environment of the ground support equipment 100 including vehicles, aircraft, ground crew, and/or other entities in a proximity of the ground support equipment 100; paths, tasks, routes, and/or status of the entities in the proximity of the ground support equipment 100; and/or other information such as traffic congestion, anticipated movements and/or obstacles, combinations thereof, or the like.

According to various embodiments of the concepts and technologies disclosed herein, the ground support equipment autonomous driving system 104 can use a current location of the ground support equipment 100, a known task associated with the ground support equipment 100, and/or other information including the sensor data 204 and/or the contextual data 212, to determine a path associated with the ground support equipment 100. This path can define an exactly location of the ground support equipment 100 and a path or route along which the ground support equipment 100 is travelling or moving to complete its current task. Thus, the ground support equipment autonomous driving system 104 can be aware of the location and intended route of a ground support equipment 100 and update that information substantially continuously (e.g., every second, every five seconds, every thirty seconds, or the like). It should be understood that this example is illustrative, and therefore should not be construed as being limiting in any way.

From operation 602, the method 600 can proceed to operation 604. At operation 604, the ground support equipment autonomous driving system 104 can detect an obstacle on the path or route of the ground support equipment 100. It should be noted that an "obstacle" herein can refer to an object that may obstruct or delay the ground support equipment 100. As explained herein, the obstacle can include, for example, an aircraft 302 that may be moving into a travel path or route of the ground support equipment 100, ground crew that may be located along the path or route of the ground support equipment 100, other ground support equipment 100, vehicles, or the like located on the path or route of the ground support equipment 100, traffic congestion along the path or route of the ground support equipment 100, combinations thereof, or the like. For example, the ground support equipment autonomous driving system 104 can be configured to determine its path determined in operation 602 to a path of an aircraft 302 (e.g., as determined in operation 508 of the method 500 illustrated and described in FIG. 5). It should be understood that this example is illustrative, and therefore should not be construed as being limiting in any way.

It can be appreciated that the contextual data 212 illustrated and described herein can also be used by the ground support equipment autonomous driving system 104 to detect one or more aircraft 302, ground support equipment 100, ground crew, or other entities that may be located on or near the airport apron 102. This data, however, can be filtered by the ground support equipment autonomous driving system 104 (e.g., via execution of the autonomous driving application 206) and/or by the data sources 108 to remove ground support equipment 100, aircraft 302, ground crew, buildings, or other obstacles that are not within a range of the ground support equipment 100 that includes the ground support equipment autonomous driving system 104. In some embodiments of the concepts and technologies disclosed herein, this can be accomplished by the data sources 208 only providing contextual data 212 for entities that are within a range and/or along a route of the ground support equipment 100 based on the sensor data 204 (which can include a location of the ground support equipment 100, movement of the ground support equipment 100) and/or known tasks and/or paths or routes associated with the ground support equipment 100. It should be understood that this example is illustrative, and therefore should not be construed as being limiting in any way.

From operation 604, the method 600 can proceed to operation 606. At operation 606, the ground support equipment autonomous driving system 104 can determine if a delay is expected along a current route or path associated with the ground support equipment 100. For example, the ground support equipment autonomous driving system 104 can determine, in operation 606, if an aircraft 302 detected in an image 400 taken by a camera of the ground support equipment 100 is moving into a roadway 308 along which the ground support equipment 100 is travelling. Alternatively, the ground support equipment autonomous driving system 104 may determine, in operation 606, that the contextual data 212 obtained in operation 602 indicates that a delay such as traffic congestion exists on the path or route being travelled by the ground support equipment 100 such as, for example, other ground support equipment waiting for an aircraft 302 to move, or the like. Because many types of delays or obstacles have been illustrated and described herein, it should be understood that operation 606 can include the ground support equipment autonomous driving system 104 analyzing the sensor data 204 and the contextual data 212 obtained in operation 602 to determine if any delay is expected on the route or path of the ground support equipment 100. It should be understood that this example is illustrative, and therefore should not be construed as being limiting in any way.

In operation 606, the ground support equipment autonomous driving system 104 can determine locations of each potential obstacle in its proximity, for example each ground support equipment 100, aircraft 302, building, ground crew, or the like. The ground support equipment autonomous driving system 104 further can determine if the ground support equipment 100 can clear the obstacle in time if the ground support equipment 100 continues travelling along its intended path, or if the ground support equipment 100 will need to avoid the obstacle by waiting for the obstacle to pass, by rerouting, by changing tasks, or the like.

If the ground support equipment autonomous driving system 104 determines, in operation 606, that a delay or obstacle is expected, the method 600 can proceed to operation 608. At operation 608, the ground support equipment autonomous driving system 104 can determine an action to take in response to detecting the delay that was determined to be expected in operation 606. In some embodiments, the action can be determined and/or taken for purposes of avoiding the detected delay. In some other embodiments, the delay may be unavoidable, so the action may be taken to avoid a collision, further delay, or the like.

For example, the ground support equipment autonomous driving system 104 can determine, for example, that the ground support equipment 100 should apply its brakes to avoid colliding with or blocking an aircraft 302 that is traversing its current path or route. Thus, for example, the ground support equipment autonomous driving system 104 may determine that the delay is unavoidable and that action should be taken to avoid a collision or the like. An example of this embodiment is shown in FIGS. 3A-3E with respect to the second ground support equipment 100B. In some other example embodiments, the ground support equipment autonomous driving system 104 may determine that a current route and/or path that the ground support equipment 100 is taking should be changed. An example of this embodiment is shown in FIGS. 3A-3E with respect to the third ground support equipment 100C.

It should be understood that the action to be taken may be based on other contextual data 212. For example, if the ground support equipment 100 is working on a time-sensitive task such as delivering luggage to a connecting flight, the action determined in operation 608 may be based on a time constraint and other considerations (e.g., fuel, driving distance, or the like) may be less important. On the other hand, if the ground support equipment 100 is involved in a task that is not time sensitive, the route may not be changed as such changes may create delays along other routes and such delays may be desirable to avoid. Thus, it can be appreciated that in addition to detecting obstacles and/or delays along a route or path, the ground support equipment autonomous driving system 104 may also determine impacts on customer service commitments and the like when determining if an action should be taken. It should be understood that this example is illustrative, and therefore should not be construed as being limiting in any way.

From operation 608, the method 600 can proceed to operation 610. At operation 610, the ground support equipment autonomous driving system 104 can generate and output display data such as the display data 214. The display data 214 generated in operation 610 can be generated to communicate, to a driver or other entity, the action to be taken as determined in operation 608. Thus, the display data 214 generated and/or output in operation 610 can include instructions to stop the ground support equipment 100, instructions to turn onto a new route or path, instructions to reverse the ground support equipment 100, and/or other displayable data for instructing a driver or other entity to take a particular action.

From operation 610, the method 600 can proceed to operation 612. At operation 612, the ground support equipment autonomous driving system 104 can determine if an override has been detected. According to various embodiments of the concepts and technologies disclosed herein, the ground support equipment autonomous driving system 104 can be configured to provide, e.g., via the display 216, an indicator to a driver or other user that the action is being taken (e.g., that a change is being made to a path or route) before implementing the action. A driver or other entity can be given an option, e.g., via the user interface displayed on the display 216, to override the suggested change or other change. Other methods of overriding suggested actions are contemplated and are possible such as, for example, voice commands, keyboard inputs, driving actions such as pressing the brakes or accelerator of the ground support equipment 100, combinations thereof, or the like. As such, the above example of overriding a suggested action using a user interface is illustrative and should not be construed as being limiting in any way.

In some embodiments, an override may be desirable. For example, a veteran driver or other user may recognize that something seen as a delay by the ground support equipment autonomous driving system 104 will not actually delay the route or path of the ground support equipment 100, and therefore may elect to override the suggested action. Thus, operation 612 can correspond to the ground support equipment autonomous driving system 104 determining if an override has been detected.

If the ground support equipment autonomous driving system 104 determines, in operation 612, that the override has not been detected, the method 600 can proceed to operation 614. At operation 614, the ground support equipment autonomous driving system 104 can implement the action determined in operation 608. Thus, for example, if the determined action was to stop the ground support equipment 100, operation 614 can correspond to the ground support equipment autonomous driving system 104 issuing a command to the ground support equipment 100 to apply the brakes. As explained above, the ground support equipment autonomous driving system 104 can include vehicle control hardware 218 that can apply the brakes of the ground support equipment 100, accelerate the ground support equipment 100, turn the steering wheel or otherwise turn or steer the ground support equipment 100, reverse the ground support equipment 100, and/or take other actions to control movements of the ground support equipment 100. As such, operation 614 can include implementing the action such as stopping the ground support equipment 100, rerouting the ground support equipment 100, changing tasks assigned to the ground support equipment 100, etc. Because other actions are possible and are contemplated, it should be understood that these examples are illustrative, and therefore should not be construed as being limiting in any way.

If the ground support equipment autonomous driving system 104 determines, in operation 612, that the override has been detected, the method 600 can proceed to operation 616. The method 600 also can proceed to operation 616 from operation 614. At operation 616, the ground support equipment autonomous driving system 104 can generate one or more updates. For example, the updates can include a location update that can be provided to the one or more data sources 208 to inform the data sources 208 about the override; an update to the path or task assigned to the ground support equipment 100 (e.g., the data sources 208 may have updated the path or task in association with the determining of the action to take, etc.); or the like. It can be appreciated that the updates can also reflect the implemented action (e.g., the changing of a route, the stopping of the ground support equipment 100, the reassignment of tasks, etc.). As such, it can be appreciated that the updates generated in operation 616 can be generated based on an implemented action or an overridden action.

From operation 616, the method 600 can proceed to operation 618. The method also can proceed to operation 618 from operation 606, if the ground support equipment autonomous driving system 104 determines, in operation 606, that no delay is expected. At operation 618, the ground support equipment autonomous driving system 104 can generate and output display data such as the display data 214. The display data 214 generated in operation 618 can be generated to indicate various entities on the path and/or route of the ground support equipment 100 for a driver or other entity. Thus, the display data 214 generated and/or output in operation 618 can include indicators showing aircraft 302 and their respective flight information, other ground support equipment and their associated tasks, combinations thereof, or the like. Because the display data 214 can include additional and/or alternative information as illustrated and described herein, it should be understood that these examples are illustrative and should not be construed as being limiting in any way.

From operation 618, the method 600 can proceed to operation 620. The method 600 can end at operation 620.

Figure 7A:
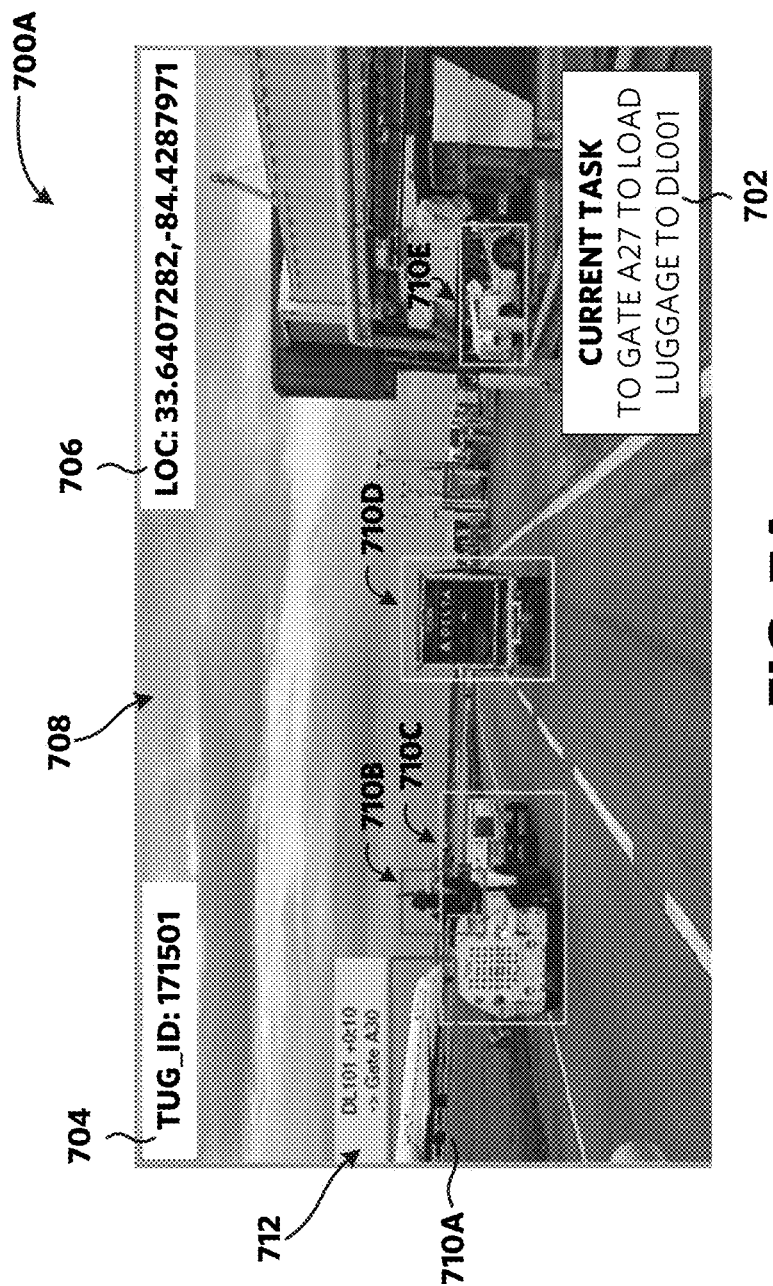
FIGS. 7A-7E are user interface diagrams showing various screen displays for interacting with an airport ground support equipment navigation system, according to some illustrative embodiments of the concepts and technologies described herein.

FIGS. 7A-7E are user interface ("UI") diagrams showing aspects of UIs for using and/or interacting with the ground support equipment autonomous driving system 104, according to some illustrative embodiments. FIG. 7A shows an illustrative screen display 700A. According to some embodiments of the concepts and technologies described herein, the screen display 700A can be generated by a device such as the ground support equipment autonomous driving system 104 based on sensor data 204 obtained from one or more sensors 202 and/or contextual data 212 obtained from one or more data sources 208. In particular, according to various embodiments, the ground support equipment autonomous driving system 104 can generate the screen display 700A and/or other screen displays in conjunction with and/or based upon interactions with the autonomous driving application 206 described herein, which can be configured to render the screen display 700A using data generated at the ground support equipment autonomous driving system 104 (e.g., the display data 214 illustrated and described herein) and/or using data provided by the sensors 202 and/or the data sources 208. It should be appreciated that the UI diagram illustrated in FIG. 7A is illustrative of one contemplated example of the UIs that can be generated and/or displayed in accordance with the concepts and technologies disclosed herein, and therefore should not be construed as being limiting in any way.

According to various embodiments, the screen display 700A can be presented, for example, while ground support equipment 100 is traversing an airport apron 102. As explained herein, the ground support equipment autonomous driving system 104 can be configured to capture a video feed from one or more cameras of the ground support equipment autonomous driving system 104, and the screen display 700A can be generated based on one image (e.g., corresponding to one frame of a captured or streamed video). Thus, it can be appreciated that the screen display 700A is illustrative of just one image of what may be a streaming view from a camera of the ground support equipment autonomous driving system 104, and therefore may be updated many times per second in some embodiments of the concepts and technologies disclosed herein. Because the screen display 700A illustrated in FIG. 7A can be displayed at additional and/or alternative times, it should be understood that these examples are illustrative and therefore should not be construed as being limiting in any way.

The screen display 700A can include various menus and/or menu options (not shown in FIG. 7A) such as options to request new routes or paths, to request a task reassignment, to request information, to provide or request driving instructions, combinations thereof, or the like. The screen display 700A also can include a current task indicator 702.

The current task indicator 702 can be configured to communicate, for example to a driver or other entity viewing the screen display 700A, a current task that has been assigned to the ground support equipment 100. It can be appreciated from the description herein that the current task assigned to the ground support equipment 100 can be obtained, for example, from the task manager 208A, though this is not necessary the case. It should be understood that the example current task indicator 702 is merely one illustrative example of a currently assigned task and should not be construed as being limiting in any way.

The screen display 700A also can include a ground support equipment identifier indicator 704. The ground support equipment identifier indicator 704 can provide an indicator of an identifier associated with the ground support equipment 100 with which the ground support equipment autonomous driving system 104 displaying the screen display 700A is associated. It can be appreciated that the ground support equipment identifier indicator 704 can correspond, for example, to an indicator painted on the ground support equipment 100, in some embodiments. This information may be helpful to a driver or other entity. For example, if an update to an assigned task, to traffic conditions, to possible obstructions, to flight statuses, or the like are provided, the ground support equipment identifier indicator 704 may be used to ensure the driver or other entity is aware of the identifier of the currently operated ground support equipment 100. Because the ground support equipment identifier indicator 704 can be included for other reasons, it should be understood that this example is illustrative, and therefore should not be construed as being limiting in any way.

The screen display 700A also can include a current location indicator 706. The current location indicator 706 can provide an indicator of the current location of the ground support equipment 100, for example GPS coordinates associated with the current location. It can be appreciated that location can be indicated in other ways (e.g., an area of the airport, a gate number, etc.), so the illustrated embodiment is merely illustrative and should not be construed as being limiting in any way.

The screen display 700A also can include a video or image feed, which can be provided as a background 708 for an augmented reality display or the like, in some embodiments. As such, it can be appreciated that the various UI elements illustrated and described herein can be overlaid on the background 708 (or other image) in various embodiments of the concepts and technologies disclosed herein. It should be understood that this example is illustrative, and therefore should not be construed as being limiting in any way.

In some other embodiments, the screen display 700A can be provided as a heads up display ("HUD") that can be projected onto a windshield, glass, or other surface of the ground support equipment 100. In yet other embodiments, the screen display 700A can be projected onto glasses, a helmet, goggles, or other headgear or the like that may be worn by a driver of the ground support equipment 100 or another entity. As shown in FIG. 7A, the screen display 700A also can include obstacle or vehicle indicator bounding boxes (obstacle indicators) 710A-E (hereinafter collectively and/or generically referred to as "obstacle indicators 710"), which can be used to highlight vehicles in a current view and/or to provide information about the vehicles. Because the obstacle indicators 710 can be provided for additional and/or alternative reasons, it should be understood that this example is illustrative, and therefore should not be construed as being limiting in any way.

As shown in FIG. 7A, the obstacle indicators 710 can be color coded, in some embodiments. Thus, for example, a blue obstacle indicator 710 such as the entity indicator 710A can indicate an aircraft 302; a red obstacle indicator 710 such as the obstacle indicator 710B can indicate a driver or other personnel; an orange obstacle indicator 710 such as the obstacle indicators 710C and 710E can indicate other tugs (or other ground support equipment); a yellow obstacle indicator 710 such as the entity indicator 710D can indicate a cart, truck, or other ground support equipment; and/or the like. It should be understood that the illustrated embodiment is illustrative and should not be construed as being limiting in any way.

Also, the screen display 700A includes a flight information flag 712, which can provide information about a detected aircraft 302. In the illustrated embodiment, the flight information flag 712 can indicate a flight number, a current status (e.g., whether the flight is currently on time or ahead of time, etc.), and a path (e.g., illustrated in FIG. 7A as heading to Gate A30) associated with the aircraft 302 indicated by the blue obstacle indicator 710A. In some embodiments, the flight information also can indicate, to a driver or other user of the ground support equipment 100, a time until the associated aircraft 302 will intersect with the path of the ground support equipment 100. In some embodiments, the screen display 700A also can indicate that the ground support equipment 100 can (or cannot) proceed due to an obstacle, as will be discussed with reference to FIG. 7C below. Because additional and/or alternative information can be included in the flight information flag 712, it should be understood that this example is illustrative, and therefore should not be construed as being limiting in any way.

The information in the flight information flag 712 can be populated by the ground support equipment autonomous driving system 104 based on information obtained from the flight information server 208N and/or other sources. This information may be useful to the driver or other entity. For example, customer service policies may dictate that a delayed flight should be allowed to proceed as quickly as possible to its gate, thereby instructing the driver of the ground support equipment 100 to stop to avoid delaying the aircraft, for example. Similarly, the information in the flight information flag 712 may be useful to the driver or other entity to understand the destination of the aircraft and/or to gauge whether or not the aircraft is potentially an obstacle. In the illustrated embodiment, the ground support equipment 100 and the aircraft 302 are heading to gates that are likely near one another, so the aircraft 302 is a potential obstacle for the ground support equipment 100 (and vice versa). It should be understood that this example is illustrative, and therefore should not be construed as being limiting in any way.

Figure 7B:
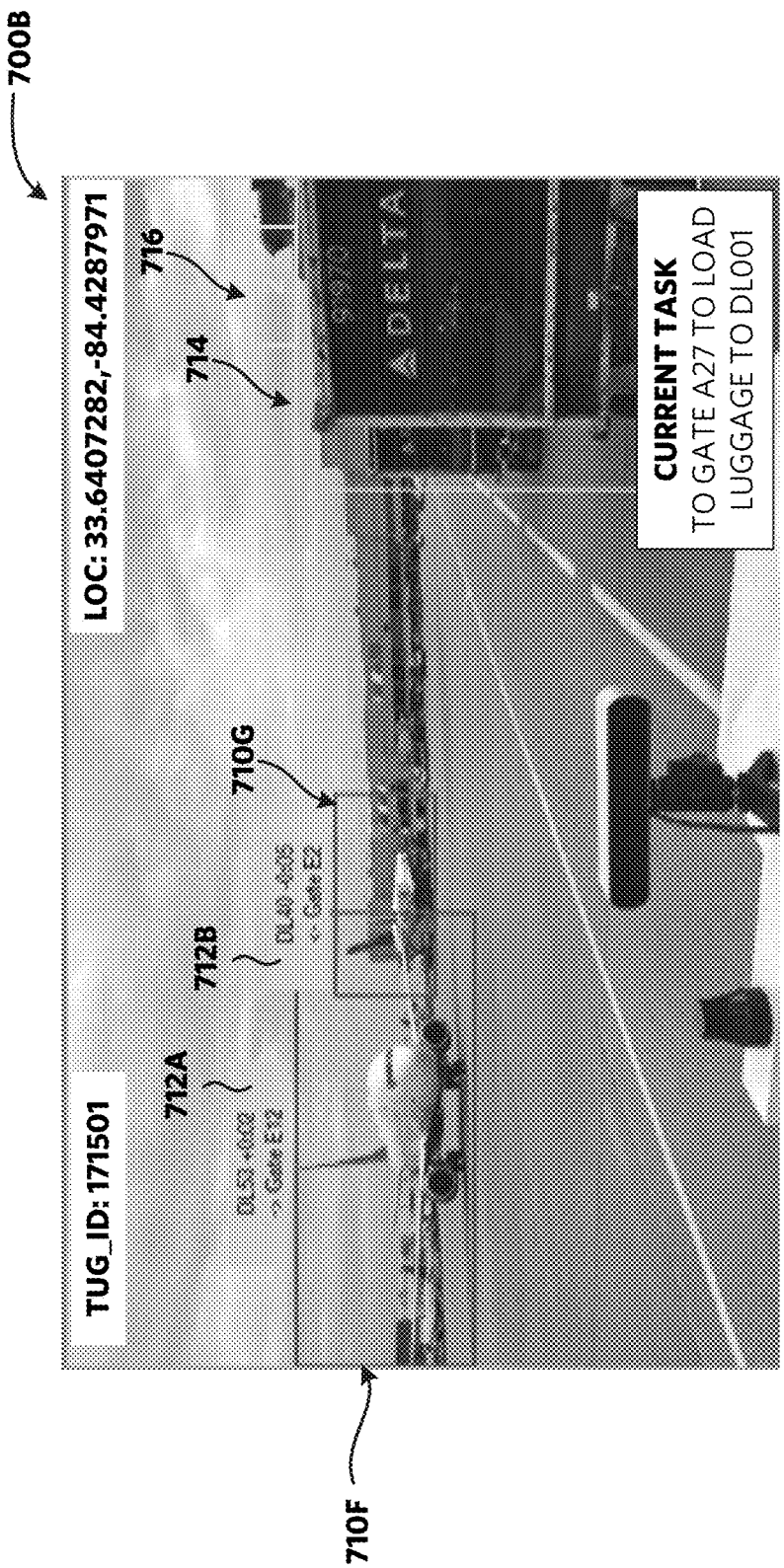

FIG. 7B shows an illustrative screen display 700B. According to some embodiments of the concepts and technologies described herein, the screen display 700B can be generated by a device such as the ground support equipment autonomous driving system 104 based on sensor data 204 obtained from one or more sensors 202 and/or contextual data 212 obtained from one or more data sources 208. In particular, according to various embodiments, the ground support equipment autonomous driving system 104 can generate the screen display 700B and/or other screen displays in conjunction with and/or based upon interactions with the autonomous driving application 206 described herein, which can be configured to render the screen display 700B using data generated at the ground support equipment autonomous driving system 104 (e.g., the display data 214 illustrated and described herein) and/or using data provided by the sensors 202 and/or the data sources 208. It should be appreciated that the UI diagram illustrated in FIG. 7B is illustrative of one contemplated example of the UIs that can be generated and/or displayed in accordance with the concepts and technologies disclosed herein, and therefore should not be construed as being limiting in any way.

The screen display 700B can be similar to the screen display 700A shown in FIG. 7A. In FIG. 7B, however, some additional features are shown. As shown in the screen display 700B, several obstacle indicators 710F, 710G and flight information flags 712A, 712B are shown. The obstacle indicators 710F and 710G indicate two aircraft in the current field of view. The flight information flag 712A indicates a flight number, a current status (e.g., in the example embodiment the flight is two minutes behind schedule), and a path (e.g., illustrated in FIG. 7B as heading to Gate E12). The flight information flag 712B indicates a flight number, a current status (e.g., in the example embodiment the flight is five minutes ahead of schedule), and a path (e.g., illustrated in FIG. 7B as disembarking from Gate E2). The information in the flight information flags 712A, 712B can be populated by the ground support equipment autonomous driving system 104 based on information obtained from the flight information server 208N and/or other sources, as noted above. Because additional and/or alternative information can be included in the flight information flags 712A, 712B, it should be understood that this illustrated examples are illustrative, and therefore should not be construed as being limiting in any way.

Figure 7C:
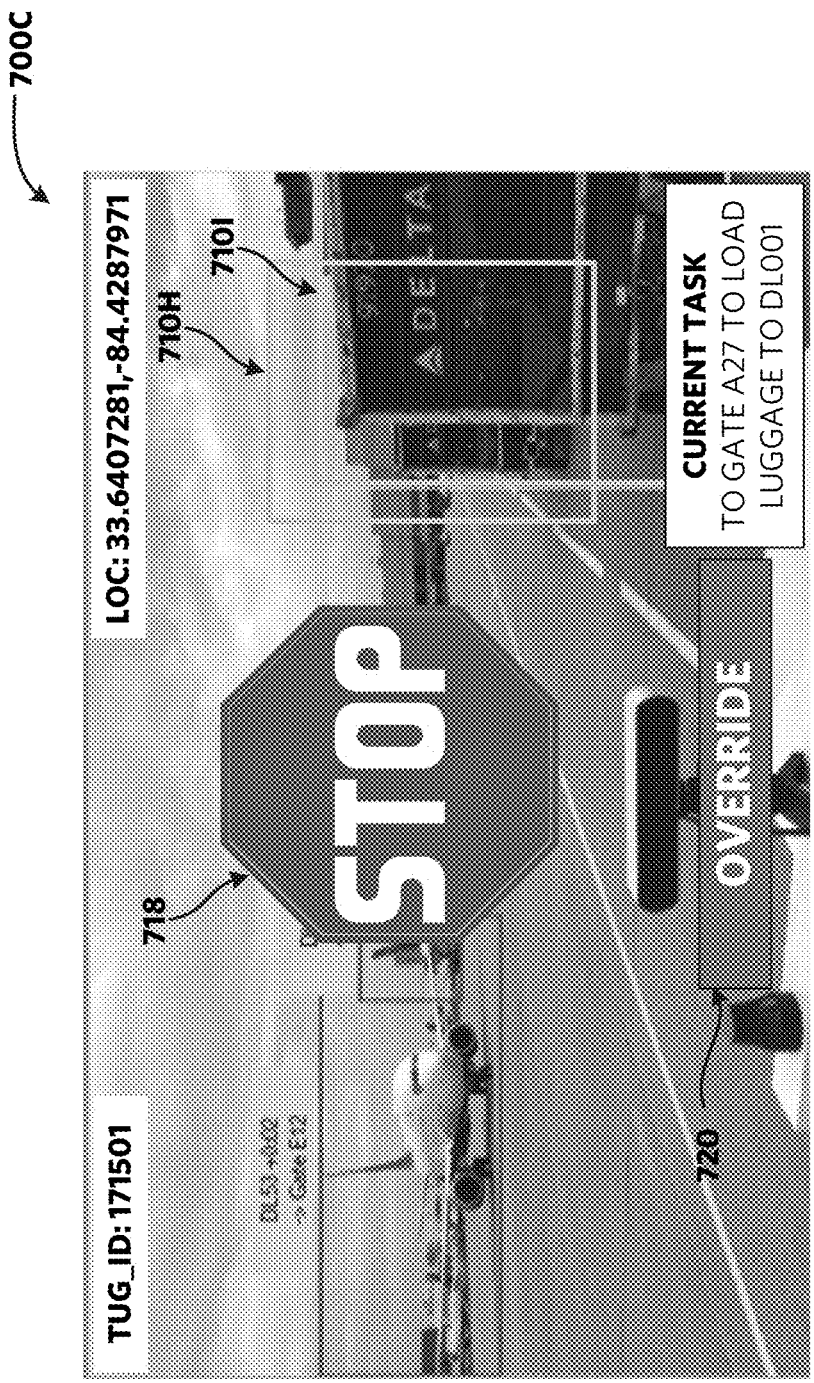

The screen display 700B also includes a combined obstacle indicator 714. The combined obstacle indicator 714 is illustrated as encompassing two vehicles that are in front of the ground support equipment 100. In some embodiments, such as the illustrated embodiment, a vehicle number indicator 716 (e.g., a numeral or other indicator) can be presented with the combined obstacle indicator 714 to indicate how many vehicles or other instances of obstacles are encompassed by the combined obstacle indicator 714. In some other embodiments, the combined obstacle indicator 714 can be omitted and overlapping obstacle indicators 710 can instead be included, as shown in FIG. 7C. Returning to FIG. 7B, the combined obstacle indicator 714 can be useful, for example, when multiple vehicles are in a line or otherwise partially obstructed and the driver or other user of the ground support equipment 100 may be unable to see how many vehicles are in front of the ground support equipment 100. Because the combined obstacle indicator 714 can be provided for additional and/or alternative reasons, it should be understood that this example is illustrative, and therefore should not be construed as being limiting in any way.

FIG. 7C shows an illustrative screen display 700C. According to some embodiments of the concepts and technologies described herein, the screen display 700C can be generated by a device such as the ground support equipment autonomous driving system 104 based on sensor data 204 obtained from one or more sensors 202 and/or contextual data 212 obtained from one or more data sources 208. In particular, according to various embodiments, the ground support equipment autonomous driving system 104 can generate the screen display 700C and/or other screen displays in conjunction with and/or based upon interactions with the autonomous driving application 206 described herein, which can be configured to render the screen display 700C using data generated at the ground support equipment autonomous driving system 104 (e.g., the display data 214 illustrated and described herein) and/or using data provided by the sensors 202 and/or the data sources 208. It should be appreciated that the UI diagram illustrated in FIG. 7C is illustrative of one contemplated example of the UIs that can be generated and/or displayed in accordance with the concepts and technologies disclosed herein, and therefore should not be construed as being limiting in any way.

The screen display 700C can include overlapping obstacle indicators 710H, 710I, as noted above. The screen display 700C also includes an action indicator 718. The action indicator 718 can instruct a driver or other entity of an action to be taken in response to detecting a delay or an obstacle as illustrated and described herein. In the illustrated embodiment, the action indicator 718 instructs the driver or other entity to stop the ground support equipment 100. It should be understood that this action indicator 718 is illustrative and should not be construed as being limiting in any way.

The screen display 700C also includes a UI control 720 for overriding the selected action. Selection of the UI control 720 (e.g., using an input device, command, or touch sensitive screen) can cause the ground support equipment autonomous driving system 104 to not implement the action as determined by the ground support equipment autonomous driving system 104. In some embodiments, the ground support equipment autonomous driving system 104 can be configured to implement the action (even if an override is requested) if a collision is imminent. As noted above, an override can be requested/commanded in additional and/or alternative manners, so the illustrated embodiment is illustrative and should not be construed as being limiting in any way. In the illustrated embodiment, selection of the UI control 720 can cause the ground support equipment 100 to continue without stopping (as indicated by the action indicator 718). It should be understood that this example is illustrative, and therefore should not be construed as being limiting in any way.

Although the action indicator 718 shown in FIG. 7C indicates that the ground support equipment 100 should stop to avoid a collision or delaying another vehicle (e.g., the aircraft 302), it should be understood that other action indicators 718 are possible and are contemplated. For example, the action indicator 718 can include an arrow or other indicator to instruct the driver or other user of the ground support equipment 100 to accelerate to avoid the obstacle. Additionally or alternatively, the graphical user interface can overlay instructions or arrows to instruct the driver or other user of the ground support equipment 100 to reroute or change direction due to the obstacle or traffic. As noted above, the ground support equipment 100 can be autonomously driven, in some embodiments, so the action indicator 718 may be merely instructive for the driver or other user, in some embodiments. Additionally or alternatively, the graphical user interface may flash a color over the image, e.g., red indicating stop, yellow indicating caution, and green indicating an unobstructed path. It should be understood that these examples are illustrative, and therefore should not be construed as being limiting in any way.

Figure 7D:
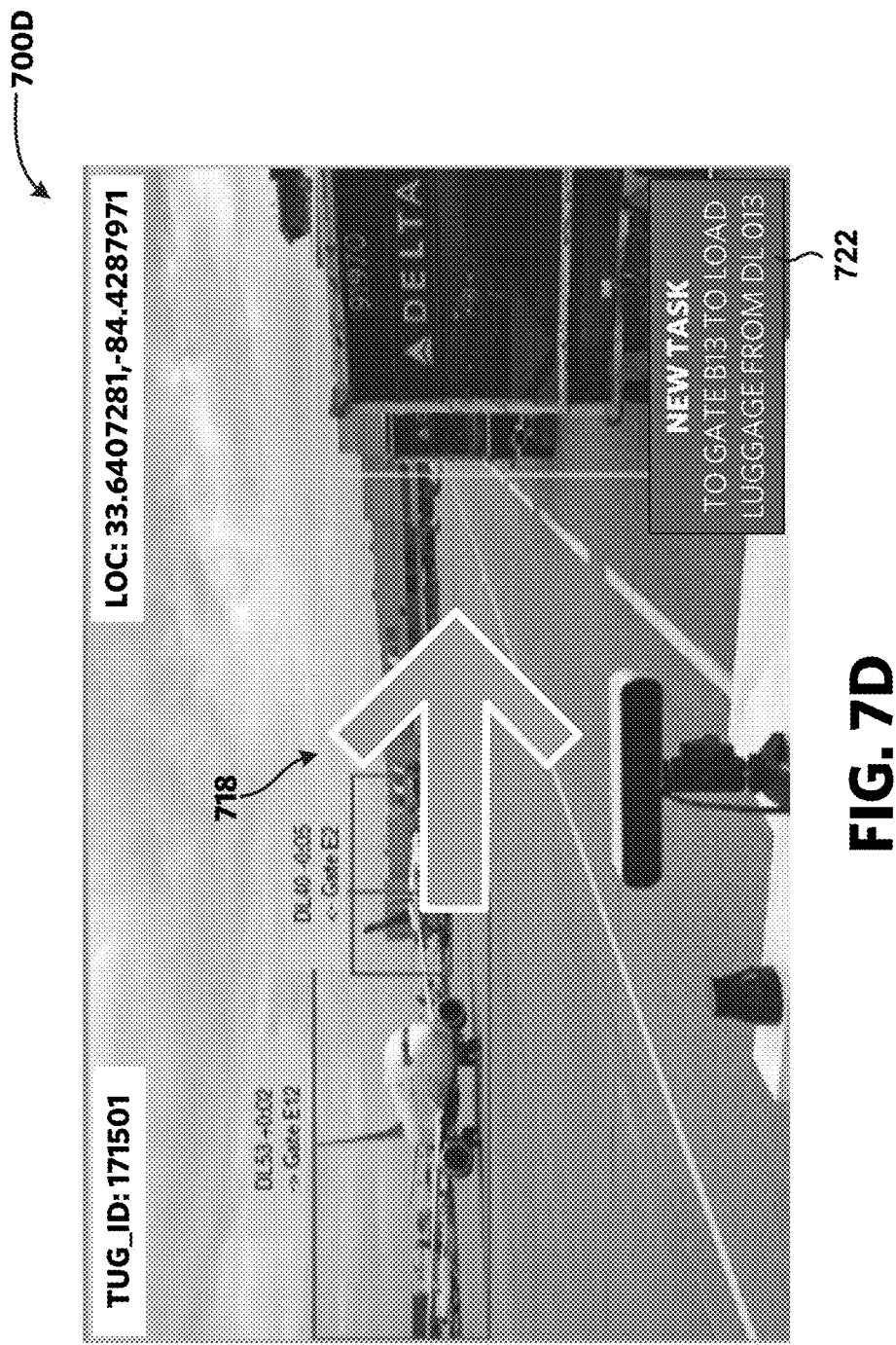

FIG. 7D shows an illustrative screen display 700D. According to some embodiments of the concepts and technologies described herein, the screen display 700D can be generated by a device such as the ground support equipment autonomous driving system 104 based on sensor data 204 obtained from one or more sensors 202 and/or contextual data 212 obtained from one or more data sources 208. In particular, according to various embodiments, the ground support equipment autonomous driving system 104 can generate the screen display 700D and/or other screen displays in conjunction with and/or based upon interactions with the autonomous driving application 206 described herein, which can be configured to render the screen display 700D using data generated at the ground support equipment autonomous driving system 104 (e.g., the display data 214 illustrated and described herein) and/or using data provided by the sensors 202 and/or the data sources 208. It should be appreciated that the UI diagram illustrated in FIG. 7D is illustrative of one contemplated example of the UIs that can be generated and/or displayed in accordance with the concepts and technologies disclosed herein, and therefore should not be construed as being limiting in any way.

The screen display 700D is illustrated as indicating that a new task and/or new route have been generated for the ground support equipment 100 in association with which the screen display 700D is being displayed. In particular, the screen display 700D includes another embodiment of the action indicator 718 illustrated and described above with reference to FIG. 7C. In FIG. 7D, the action indicator 718 also can instruct a driver or other entity of an action to be taken in response to detecting a delay or an obstacle as illustrated and described herein. In FIG. 7D, the action indicator 718 instructs the driver or other entity to turn the ground support equipment 100 to follow a new route and/or to avoid the obstacle or delay (illustrated in FIG. 7D as an instruction to turn to the right). It should be understood that this action indicator 718 is illustrative and should not be construed as being limiting in any way.

The screen display 700D also includes a new task indicator 722. The new task indicator 722 can be configured to communicate a new task assigned to the ground support equipment 100. As illustrated and described herein, the task assigned to the ground support equipment 100 can be updated in response to detecting an obstacle or delay. As such, the new task indicator 722 can communicate, to the driver or other entity, that a new task has been assigned to the associated ground support equipment 100. This is communicated, in some embodiments as shown in FIG. 7D, by highlighting the changes to the route using the new task indicator 722, which can include, for example, a red background and/or other colors and/or text and/or animation to draw the attention of the driver and/or other user to the indication of the new task. It can be appreciated from the description herein that the new task assigned to the ground support equipment 100 can be obtained, for example, from the task manager 208A, though this is not necessary the case. It should be understood that the example new task indicator 722 is merely one illustrative example of a newly assigned task and how that task can be communicated to a driver or other entity (if optional communication is included) and should not be construed as being limiting in any way.

The screen display 700D also can include options to override the changes, as illustrated and described herein, though this is not illustrated in FIG. 7D. In some embodiments, the ground support equipment autonomous driving system 104 can be configured to implement the action indicated by the action indicator 718, as explained above. As noted above, the ground support equipment 100 can be autonomously driven, in some embodiments, so the action indicator 718 may be merely instructive for the driver or other user, in some embodiments. It should be understood that these examples are illustrative, and therefore should not be construed as being limiting in any way.

Figure 7E:
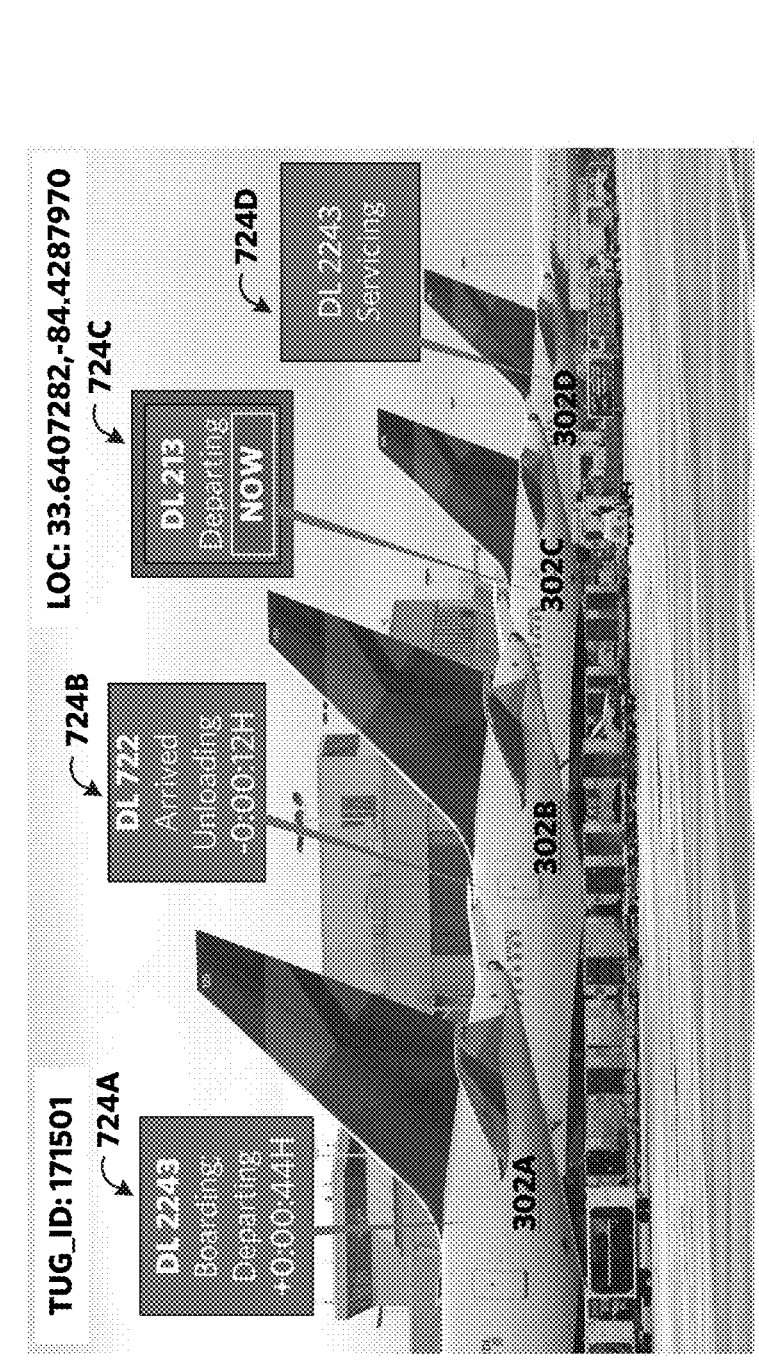

FIG. 7E shows an illustrative screen display 700E. According to some embodiments of the concepts and technologies described herein, the screen display 700E can be generated by a device such as the ground support equipment autonomous driving system 104 based on sensor data 204 obtained from one or more sensors 202 and/or contextual data 212 obtained from one or more data sources 208. In particular, according to various embodiments, the ground support equipment autonomous driving system 104 can generate the screen display 700E and/or other screen displays in conjunction with and/or based upon interactions with the autonomous driving application 206 described herein, which can be configured to render the screen display 700E using data generated at the ground support equipment autonomous driving system 104 (e.g., the display data 214 illustrated and described herein) and/or using data provided by the sensors 202 and/or the data sources 208. It should be appreciated that the UI diagram illustrated in FIG. 7E is illustrative of one contemplated example of the UIs that can be generated and/or displayed in accordance with the concepts and technologies disclosed herein, and therefore should not be construed as being limiting in any way.

The screen display 700E is illustrated as providing a driver or other entity an informational display that provides task and/or potential obstacle information for multiple vehicles (e.g., multiple aircraft 302). In the illustrated embodiment shown in FIG. 7E, multiple aircraft 302 are visible, and four of the aircraft 302 potentially are obstacles for the ground support equipment 100 in association with which the screen display 700E is being displayed (e.g., on a display 216, in a heads up display, etc.). It can be appreciated from the description herein that the paths associated with the multiple vehicles (e.g., multiple aircraft 302) may be unknown to the driver or other entity. For example, from looking at the aircraft 302, the driver or other entity may be unaware of whether the aircraft are arriving, parked idly, departing, or the like. Thus, embodiments of the concepts and technologies disclosed herein can be used to provide information associated with the aircraft that potentially obstruct the ground support equipment 100 to the driver or other entity. For example, if an aircraft 302 disembarks its current gate, it may be pushed back into the path of the ground support equipment 100, thereby delaying or obstructing the ground support equipment 100. Such information can be communicated as illustrated and described herein. It should be understood that this example is illustrative, and therefore should not be construed as being limiting in any way.

In the illustrated embodiment, four vehicle status display flags 724A-D (hereinafter collectively and/or generically referred to as "vehicle status display flags 724") are displayed. As shown in FIG. 7E, the vehicle status display flags 724 can include an indication of an associated aircraft 302, and the status for that aircraft 302 can be displayed on the vehicle status display flag 724. It can be appreciated that to a casual observer, the four aircraft 302 pictured in FIG. 7E can look essentially identical, other than identifiers, etc. Thus, a driver or other entity may or may not be aware of whether the various aircraft potentially will obstruct or delay the progress of the ground support equipment 100 on its intended path (e.g., which aircraft 302 is/are loading, which aircraft 302 is/are unloading, which aircraft 302 is/are departing, which aircraft 302 is/are arriving, etc.).

As such, embodiments of the concepts and technologies disclosed herein can obtain data such as the contextual data 212 from the data sources 208 (e.g., the task manager 208A, the location manager 208B, the automatic dependent surveillance-broadcast server 208C, the flight information server 208N, etc.) and generate the vehicle status display flags 724 based on the contextual data 212. In the embodiment illustrated in FIG. 7E, the aircraft 302A associated with the vehicle status display flag 724A is illustrated as currently boarding and not departing for another forty four minutes. It should be understood that this example is illustrative, and therefore should not be construed as being limiting in any way.

Similarly, the aircraft 302B associated with the vehicle status display flag 724B is illustrated as having arrived about twelve minutes prior and currently unloading. It should be understood that this example is illustrative, and therefore should not be construed as being limiting in any way. The aircraft 302C associated with the vehicle status display flag 724C can be currently departing (e.g., being pushed back from its associated gate currently and/or at any moment); and the aircraft 302D associated with the vehicle status display flag 724D is illustrated as currently being serviced. It should be understood that this example is illustrative, and therefore should not be construed as being limiting in any way.

From the embodiment shown in FIG. 7E, it can be appreciated that only the aircraft 302C, which is associated with the vehicle status display flag 724C, can currently potentially be an obstacle at any moment for the ground support equipment 100. As shown in FIG. 7E, various animations, colors, or the like can be used to communicate this status to a driver or other entity. As can be appreciated with reference to FIG. 7E, embodiments of the concepts and technologies disclosed herein can be used to supplement a current view with information about vehicles or other obstacles that otherwise may be unknowable by the driver or other entity. It should be understood that this example is illustrative, and therefore should not be construed as being limiting in any way.

Figure 8:
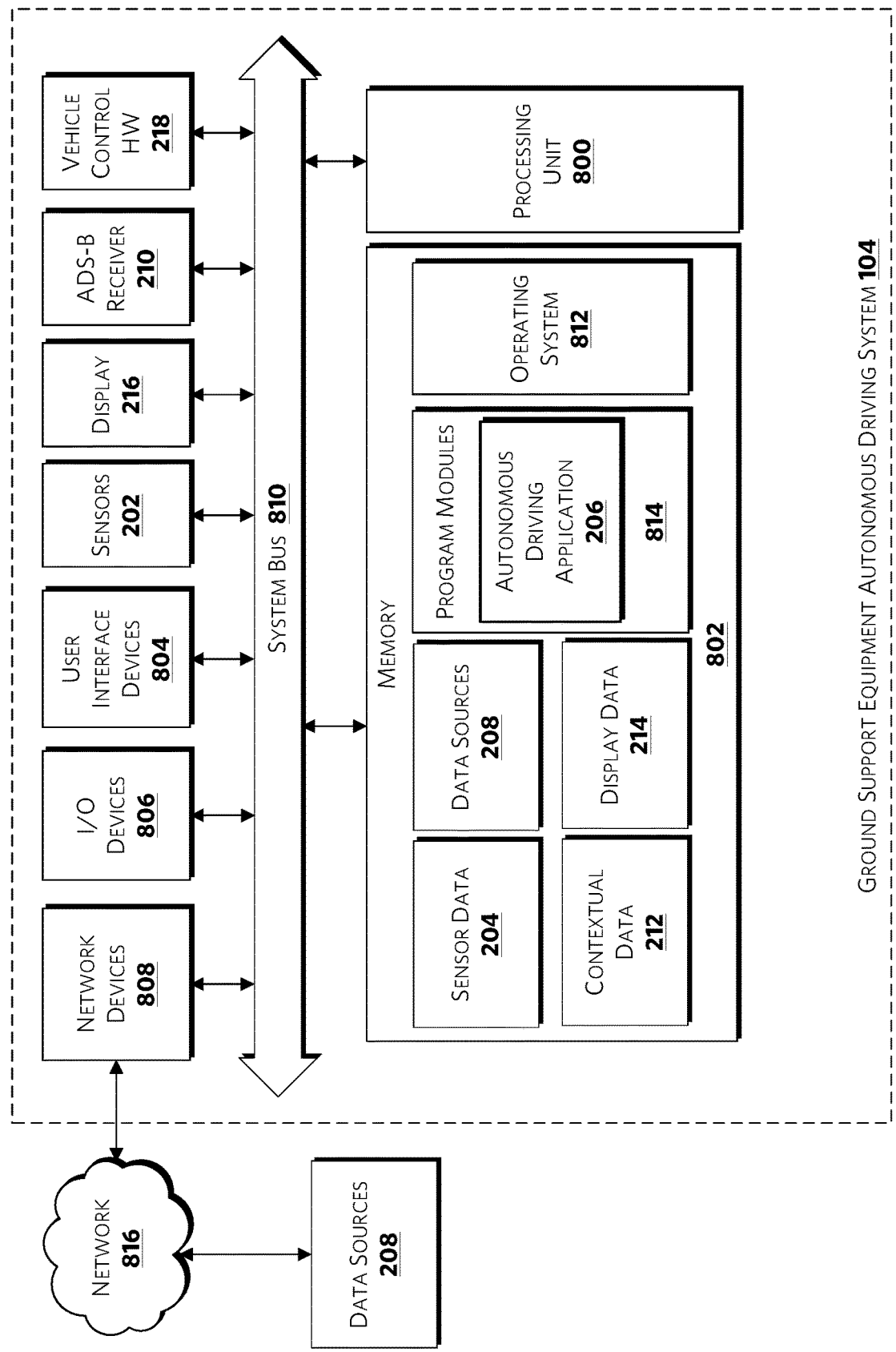
FIG. 8 is a block diagram illustrating an example computer system capable of implementing aspects of the concepts and technologies disclosed herein for providing an airport ground support equipment navigation system, according to some illustrative embodiments of the concepts and technologies described herein.

FIG. 8 is a block diagram illustrating a computer or computer system that can be configured to provide the functionality described herein for the ground support equipment autonomous driving system 104 and/or other computing devices such as, in some embodiments, the data sources 208, in accordance with various embodiments of the concepts and technologies disclosed herein. As shown in FIG. 8, the ground support equipment autonomous driving system 104 can include a processing unit 800, a memory 802, one or more user interface devices 804, one or more input/output ("I/O") devices 806, one or more network devices 808, the sensors 202, and the display 216 (which can be included as one of the I/O devices 806 and/or can be separate from the I/O devices 806), each of which can be operatively connected to a system bus 810. The bus 810 can enable bi-directional communication between the processing unit 800, the memory 802, the user interface devices 804, the I/O devices 806, the network devices 808, the sensors 202, the display 216, and/or other elements of the ground support equipment autonomous driving system 104.

The processing unit 800 can include a standard central processor that can perform arithmetic and/or logical operations, a more specific purpose programmable logic controller ("PLC"), a programmable gate array, or other type of processor known to those skilled in the art and/or suitable for controlling the operation of the ground support equipment autonomous driving system 104. As used herein, the word "processor" and/or the phrase "processing unit" when used with regard to the ground support equipment autonomous driving system 104 can include multiple processors or processing units distributed across and/or operating in parallel in a single machine and/or in multiple machines. Furthermore, processors and/or processing units can be used to support virtual processing environments and/or virtual processing technologies in a networked and/or non-networked environment. Because processors and/or processing units are generally known, the processors and processing units disclosed herein will not be described in further detail here.

The memory 802 can communicate with the processing unit 800 via the system bus 810. In some embodiments, the memory 802 can be operatively connected to a memory controller (not shown) that can enable communication with the processing unit 800 via the system bus 810. In various embodiments of the concepts and technologies disclosed herein, the memory 802 can store an operating system 812 and/or one or more program modules 814. The operating system 812 can include, but is not limited to, members of the WINDOWS, WINDOWS CE, and/or WINDOWS MOBILE families of operating systems from MICROSOFT CORPORATION; members of the LINUX family of operating systems; members of the SYMBIAN family of operating systems from SYMBIAN LIMITED; members of the BREW family of operating systems from QUALCOMM CORPORATION; members of the MAC OS, iOS, and/or LEOPARD families of operating systems from APPLE CORPORATION; members of the FREEBSD family of operating systems; members of the SOLARIS family of operating systems from ORACLE CORPORATION; other operating systems; and the like.

The program modules 814 may include various software and/or program modules as illustrated and described herein. In some embodiments, for example, the program modules 814 can include the autonomous driving application 206 as illustrated and described herein. This and/or other programs can be embodied in computer-readable media containing instructions that, when executed by the processing unit 800, can perform one or more of the methods 500 and 600 illustrated and described in detail above with respect to FIGS. 5-6 and/or other functionality as illustrated and described herein. It can be appreciated that, at least by virtue of the instructions embodying the methods 500 and 600, and/or other functionality illustrated and described herein being stored in the memory 802 and/or accessed and/or executed by the processing unit 800, the ground support equipment autonomous driving system 104 can be transformed into a special-purpose computing system that can facilitate providing the functionality illustrated and described herein for enabling an airport ground support equipment navigation system.

According to embodiments, the program modules 814 may be embodied in hardware, software, firmware, or any combination thereof. As shown in FIG. 8, the memory 802 also can be configured to store the sensor data 204, the data sources 208, the contextual data 212, the display data 214, and/or other data as described herein, if desired. In some embodiments, as will be explained in more detail below, the data sources 208 may be remote from the ground support equipment autonomous driving system 104. As such, it should be understood that the illustrated example is illustrative, and therefore should not be construed as being limiting in any way.

By way of example, and not limitation, computer-readable media may include communication media and computer storage media, each of which can be accessed by the ground support equipment autonomous driving system 104. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store the desired information and that can be accessed by the ground support equipment autonomous driving system 104. In the claims, the phrase "computer storage medium" and variations thereof excludes waves and signals per se and/or communication media as defined herein.

The user interface devices 804 may include one or more devices with which a user accesses the ground support equipment autonomous driving system 104. The user interface devices 804 may include, but are not limited to, computers, servers, personal digital assistants, cellular phones, or any suitable computing devices. The I/O devices 806 can be used to enable a user to interface with the program modules 814 and/or other aspects of the ground support equipment autonomous driving system 104. In one embodiment, the I/O devices 806 can be operatively connected to an I/O controller (not shown) that can enable communication with the processing unit 800 via the system bus 810. The I/O devices 806 may include one or more input devices, such as, but not limited to, a keyboard, a mouse, a touch screen, a joystick, a steering wheel, a haptic device, a gestural device, an electronic stylus, and/or other devices. Furthermore, the I/O devices 806 may include one or more output devices, such as, but not limited to, a display screen or a printer such as, for example, the display 216 illustrated and described herein.

The network devices 808 can enable the ground support equipment autonomous driving system 104 to communicate with other networks or remote systems via a network such as, for example, the network 816. Examples of the network devices 808 include, but are not limited to, a modem, a radio frequency ("RF") or infrared ("IR") transceiver, a telephonic interface, a bridge, a router, or a network card. The network 816 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 816 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). The ground support equipment autonomous driving system 104 can include the data sources 208 illustrated and described herein, in some embodiments. In some other embodiments, the ground support equipment autonomous driving system 104 can access the data sources 208 using the network devices 808 (e.g., via the network 816). The ground support equipment autonomous driving system 104 also can include the vehicle control hardware 218, as illustrated and described herein. It should be understood that these examples are illustrative, and therefore should not be construed as being limiting in any way.

Based on the foregoing, it should be appreciated that an airport ground support equipment navigation system has been disclosed herein. Although the subject matter presented herein has been described with respect to various structural features and/or methodological and transformative acts for forming the airport ground support equipment navigation system and/or the various features thereof, it is to be understood that the concepts and technologies disclosed herein are not necessarily limited to the specific features or acts described herein. Rather, the specific features and acts are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
capturing, at a ground support equipment comprising a ground support equipment navigation system, sensor data comprising an image captured by a camera located at the ground support equipment;
detecting, by the ground support equipment navigation system and using object recognition applied to the image, an aircraft in the image;
obtaining, by the ground support equipment navigation system and from data sources, contextual data associated with the aircraft and with the ground support equipment;
determining, by the ground support equipment navigation system and based on the contextual data, a ground support equipment path via which the ground support equipment will travel to complete a task;
determining, by the ground support equipment navigation system and based on the contextual data, an aircraft path associated with the aircraft, wherein the contextual data indicates if the aircraft is moving along the aircraft path or is about to move along the aircraft path;
determining, by the ground support equipment navigation system and based on the ground support equipment path and the aircraft path, if a delay is expected along the ground support equipment path due to the aircraft; and
if the delay is expected along the ground support equipment path, determining, by the ground support equipment navigation system, an action to take to avoid the delay, wherein the ground support equipment comprises a ground support equipment autonomous driving system that is configured to autonomously implement the action to avoid the delay.

2. The method of claim 1, further comprising:
generating, at the ground support equipment navigation system, display data that indicates the delay and the action, wherein the display data is rendered at the ground support equipment to present a user interface, wherein the user interface indicates the delay, the action, and an option to override the action.

3. The method of claim 2, further comprising:
detecting, based on an interaction with the user interface, an override of the action and
generating an update based on the override.

4. The method of claim 1, wherein the action comprises stopping the ground support equipment.

5. The method of claim 1, wherein the action comprises redirecting the ground support equipment along an alternative ground support equipment path via which the ground support equipment will travel to complete the task.

6. The method of claim 1, further comprising presenting, at the ground support equipment navigation system, a user interface that comprises a vehicle status display flag associated with the aircraft, wherein the vehicle status display flag indicates one of:
the aircraft is currently loading;
the aircraft is currently being serviced; or
the aircraft is currently departing a gate.

7. The method of claim 1, wherein detecting the aircraft further comprises identifying the aircraft by extracting, from the image and using text recognition, a registration number associated with the aircraft.

8. The method of claim 7, wherein identifying the aircraft further comprises determining, based on the text recognition and the object recognition, information that indicates a carrier associated with the aircraft, a manufacturer of the aircraft, and a model of the aircraft.

9. The method of claim 1, wherein the contextual data indicates one of:
the aircraft is currently loading;
the aircraft is currently being serviced; or
the aircraft is currently departing a gate.

10. The method of claim 1, further comprising presenting, at the ground support equipment navigation system, a user interface that indicates the action, and wherein the action comprises redirecting the ground support equipment along an alternative ground support equipment path via which the ground support equipment will travel to complete the task.

11. The method of claim 1, wherein the sensor data comprises location data that indicates a location of the ground support equipment when the image was captured.

12. A ground support equipment comprising:
a ground support equipment navigation system comprising a processor;
sensors comprising a camera; and
a memory that stores computer-executable instructions that, when executed by the processor, cause the processor to perform operations comprising:
capturing sensor data comprising an image captured by the camera;
detecting, using object recognition applied to the image, an aircraft in the image;
obtaining, from data sources, contextual data associated with the aircraft and with the ground support equipment;
determining, based on the contextual data, a ground support equipment path via which the ground support equipment will travel to complete a task;
determining, based on the contextual data, an aircraft path associated with the aircraft, wherein the contextual data indicates if the aircraft is moving along the aircraft path or is about to move along the aircraft path;
determining, based on the ground support equipment path and the aircraft path, if a delay is expected along the ground support equipment path due to the aircraft; and
if the delay is expected along the ground support equipment path, determining an action to take to avoid the delay, wherein the ground support equipment comprises a ground support equipment autonomous driving system that is configured to autonomously implement the action to avoid the delay.

13. The ground support equipment of claim 12, wherein the computer-executable instructions, when executed by the processor, cause the processor to perform operations further comprising:
generating, at the ground support equipment navigation system, display data that indicates the delay and the action, wherein the display data is rendered at the ground support equipment to present a user interface, wherein the user interface indicates the delay, the action, and an option to override the action.

14. The ground support equipment of claim 12, wherein detecting the aircraft further comprises identifying the aircraft by extracting, from the image and using text recognition and the object recognition, a registration number associated with the aircraft, information that indicates a carrier associated with the aircraft, a manufacturer of the aircraft, and a model of the aircraft.

15. The ground support equipment of claim 14, wherein the contextual data indicates one of:
the aircraft is currently loading;
the aircraft is currently being serviced; or
the aircraft is currently departing a gate.

16. The ground support equipment of claim 12, wherein the computer-executable instructions, when executed by the processor, cause the processor to perform operations further comprising:
presenting, at the ground support equipment navigation system, a user interface that comprises a vehicle status display flag associated with the aircraft, wherein the vehicle status display flag indicates one of
the aircraft is currently loading,
the aircraft is currently being serviced, or
the aircraft is currently departing a gate.

17. A system comprising ground support equipment comprising a processor, sensors comprising a camera, and a memory that stores computer-executable instructions that, when executed by the processor, cause the processor to perform operations comprising:
capturing sensor data comprising an image captured by the camera;
detecting, and using object recognition applied to the image, an aircraft in the image;
obtaining, from data sources, contextual data associated with the aircraft and the ground support equipment;
determining, based on the contextual data, a ground support equipment path via which the ground support equipment will travel to complete a task;
determining, based on the contextual data, an aircraft path associated with the aircraft wherein the contextual data indicates if the aircraft is moving along the aircraft path or is about to move along the aircraft path;
determining, based on the ground support equipment path and the aircraft path, if a delay is expected along the ground support equipment path due to the aircraft; and
if the delay is expected along the ground support equipment path, determining an action to take to avoid the delay, wherein the ground support equipment comprises a ground support equipment autonomous driving system that is configured to autonomously implement the action to avoid the delay.

18. The system of claim 17, wherein detecting the aircraft further comprises identifying the aircraft by extracting, from the image and using text recognition and the object recognition, a registration number associated with the aircraft, information that indicates a carrier associated with the aircraft, a manufacturer of the aircraft, and a model of the aircraft.

19. The system of claim 18, wherein the contextual data indicates one of:
the aircraft is currently loading;
the aircraft is currently being serviced; or
the aircraft is currently departing a gate.

20. The system of claim 17, wherein the computer-executable instructions, when executed by the processor, cause the processor to perform operations further comprising presenting, at the ground support equipment, a user interface that comprises a vehicle status display flag associated with the aircraft, wherein the vehicle status display flag indicates one of:
the aircraft is currently loading;
the aircraft is currently being serviced; or
the aircraft is currently departing a gate.

* * * * *

UNITED STATES PATENT AND TRADEMARK OFFICE
CERTIFICATE OF CORRECTION

| | | |
|---|---|---|
| PATENT NO. | : 11,726,484 B1 | Page 1 of 1 |
| APPLICATION NO. | : 17/337119 | |
| DATED | : August 15, 2023 | |
| INVENTOR(S) | : Sterling Gerdes et al. | |

It is certified that error appears in the above-identified patent and that said Letters Patent is hereby corrected as shown below:

In the Claims

In Claim 3, Line 5, please replace "the action and" with --the action; and--.

Signed and Sealed this
Third Day of October, 2023

*Katherine Kelly Vidal*

Katherine Kelly Vidal
*Director of the United States Patent and Trademark Office*